US012768106B2

(12) United States Patent
Kotilainen

(10) Patent No.: US 12,768,106 B2
(45) Date of Patent: Oct. 20, 2026

(54) BCTMP-TAILORED LOW BASIS WEIGHT SCK PAPER FOR RELEASE LINER

(71) Applicant: UPM-Kymmene Corporation, Helsinki (FI)

(72) Inventor: Jukka Kotilainen, Helsinki (FI)

(73) Assignee: UPM-Kymmene Corporation, Helsinki (FI)

( * ) Notice: Subject to any disclaimer, the term of this patent is extended or adjusted under 35 U.S.C. 154(b) by 182 days.

(21) Appl. No.: 18/757,680

(22) Filed: Jun. 28, 2024

(65) Prior Publication Data

US 2026/0002321 A1 Jan. 1, 2026

(51) Int. Cl.

| | |
|---|---|
| ***D21H 11/10*** | (2006.01) |
| ***C09J 7/40*** | (2018.01) |
| ***D21H 11/20*** | (2006.01) |
| ***D21H 19/72*** | (2006.01) |
| ***D21H 27/00*** | (2006.01) |

(52) U.S. Cl.

CPC .............. *D21H 11/10* (2013.01); *C09J 7/405* (2018.01); *D21H 11/20* (2013.01); *D21H 19/72* (2013.01); *D21H 27/001* (2013.01)

(58) Field of Classification Search

CPC ........ D21H 11/10; D21H 11/20; D21H 19/72; D21H 27/001; D21H 11/04; D21H 25/00; D21H 25/005; D21H 25/08; C09J 7/405; C09J 2203/334; C09J 400/283; D21F 11/00

See application file for complete search history.

(56) References Cited

U.S. PATENT DOCUMENTS

| | | | | |
|---|---|---|---|---|
| 5,316,621 | A | 5/1994 | Kitao et al. | |
| 10,113,006 | B2 * | 10/2018 | Rissanen | C08B 15/02 |
| 12,473,693 | B2 * | 11/2025 | Rissanen | D21H 11/20 |
| 2005/0126729 | A1 | 6/2005 | Koskinen et al. | |
| 2007/0082212 | A1 | 4/2007 | Corrigan et al. | |
| 2009/0104431 | A1 | 4/2009 | Kishida et al. | |
| 2010/0203318 | A1 | 8/2010 | Galembeck et al. | |
| 2017/0190799 | A1 | 7/2017 | Rissanen et al. | |
| 2018/0298556 | A1 | 10/2018 | Xu et al. | |
| 2020/0173109 | A1 | 6/2020 | Saukkonen et al. | |
| 2021/0340708 | A1 | 11/2021 | Kosonen et al. | |
| 2024/0218295 | A1 | 7/2024 | Thompson et al. | |
| 2024/0287741 | A1 * | 8/2024 | Rissanen | D21H 11/20 |
| 2025/0092604 | A1 * | 3/2025 | Kotilainen | D21H 5/0077 |
| 2026/0002321 | A1 * | 1/2026 | Kotilainen | D21H 11/10 |
| 2026/0028777 | A1 * | 1/2026 | Kotilainen | D21H 11/04 |

FOREIGN PATENT DOCUMENTS

| | | | | | |
|---|---|---|---|---|---|
| CN | 106471079 | A | * | 3/2017 | C09J 7/403 |
| CN | 119855959 | A | * | 4/2025 | C08J 7/048 |
| EP | 3059344 | A1 | | 8/2016 | |
| EP | 3059344 | B1 | * | 12/2017 | D21H 27/001 |
| EP | 3805453 | A1 | | 4/2021 | |
| EP | 3870755 | A1 | | 9/2021 | |
| EP | 4074892 | A1 | | 10/2022 | |
| EP | 3161087 | B1 | * | 12/2023 | C08B 15/02 |
| EP | 4310249 | A1 | | 1/2024 | |
| EP | 3870755 | B1 | * | 4/2024 | D21H 11/14 |
| EP | 4671441 | A1 | * | 12/2025 | D21H 15/02 |
| JP | 04209881 | | | 7/1992 | |
| JP | H04209881 | A | | 7/1992 | |
| JP | H05209383 | A | | 8/1993 | |
| JP | 07109699 | | | 4/1995 | |
| JP | H07109699 | A | | 4/1995 | |
| JP | H07216321 | A | | 8/1995 | |
| JP | 2007186816 | A | | 7/2007 | |
| WO | 0159212 | A1 | | 8/2001 | |
| WO | WO-2020084188 | A1 | * | 4/2020 | D21H 27/001 |
| WO | 2021255326 | A1 | | 12/2021 | |
| WO | 2022086456 | A1 | | 4/2022 | |
| WO | 2024099607 | A1 | | 5/2024 | |
| WO | WO-2024141419 | A1 | * | 7/2024 | D21H 27/06 |
| WO | WO-2024141707 | A1 | * | 7/2024 | D21H 27/06 |

OTHER PUBLICATIONS

International Search Report and Written Opinion for International Application No. PCT/FI2023/050724; International Filing Date Dec. 21, 2023; Report Mail Date Mar. 22, 2024 (16 Pages).

International Search Report and Written Opinion for International Application No. PCT/EP2023/075765; International Filing Date Sep. 19, 2023; Report Mail Date Jan. 3, 2024 (12 Pages).

International Search Report and Written Opinion for International Application No. PCT/FI2023/050725; International Filing Date Dec. 21, 2023; Report Mail Date Mar. 22, 2024 (14 Pages).

European Search Report for European Patent Application No. 24185175.7 dated Dec. 5, 2024.

European Application No. 24185175.7, "A BCTMP-tailored low basis weight glassine paper for release liner"; 62 pages.

* cited by examiner

*Primary Examiner* — Jose A Fortuna
(74) *Attorney, Agent, or Firm* — Nixon Peabody LLP

(57) ABSTRACT

The invention relates to a method for manufacturing SCK paper having a basis weight of less than 50 $g/m^2$, wherein an optimal combination of BSKP, BHKP and BCTMP is used to adjust the properties of the fiber furnish. In SCK papers with very low basis weight the formation of the paper web upon paper manufacturing may be controlled by means of the fiber furnish optimization, which can be used to produce exceptionally thin SCK paper without downgauging and without adverse effects to other paper properties, which would prevent the use of the SCK paper as substrate layer in a release liner. Thus SCK paper with a moderate share of BCTMP in the fiber furnish may be produced, that has quality characteristics of the paper sufficient for use as a substrate layer of an industrial release liner.

18 Claims, 5 Drawing Sheets

BCTMP-TAILORED LOW BASIS WEIGHT SCK PAPER FOR RELEASE LINER

FIELD OF THE INVENTION

The invention relates to a supercalendered kraft paper suitable for use as a substrate layer of an industrial release liner for adhesive labels having a low basis weight of less than 50 g/m$^2$, preferably between 30 and 50 g/m$^2$, which contains bleached kraft pulp comprising softwood fibers and hardwood fibers, and bleached chemithermomechanical pulp. The invention further relates to a method for manufacturing such supercalendered kraft paper and to a release liner, which contains such supercalendered kraft paper.

BACKGROUND

The packaging industry is booming and adhesive labels are in high demand. As a result of this, the label industry is trying to increase the speed of the existing labelling processes, to meet this demand. This resonates to the supply chain, all the way down to the global pulp production. Release liner plays a significant role in the production and exploitation of adhesive labels. Hence, there is a need for improved ways of producing papers suitable for release liners, which is challenging, however, due to the high quality and functionality expected from these paper types.

A release liner refers to a product comprising a substrate layer and a release coating, such as a silicon polymer based compound, applied on at least one side of the substrate layer. Release liners are widely used as backing materials in labelling applications with adhesive labels, which explains the expectation of high quality. The substrate layer should have sufficient characteristics to withstand the stresses applied at today's high-speed automated labelling processes. The substrate layer typically comprises a paper and a primer coating applied on at least one side of the paper. Examples of paper types suitable for use as release liner substrate layers are glassine paper, supercalendered kraft paper and clay coated paper. Conventionally, to meet the quality expectations, highly refined bleached chemical pulp, such as bleached kraft pulp, hereafter denoted as BKP, is used for manufacturing a paper suitable for use as a substrate layer of an industrial release liner. The amount of hardwood in the pulp mixture is typically high, in order to obtain a good formation and a paper having sufficient incompressibility, smoothness and dense structure. Prior to release coating the paper is also calendered, to increase the transparency and to provide a dense and smooth surface and a desired target thickness which meets the tolerance level set by the die-cutting system. Label producers use a release liner as a substrate for producing a face stock, from which the adhesive labels are cut. Minimal variation of release liner thickness is desired, to facilitate an even die strike pattern at a depth needed for the intended application. Different depth of impression left by the blades is used for different applications. High level of transparency is needed from the paper, since optical sensors are widely used for tracking the position of the labels on the release liner. Typically the optical sensors measure the brightness variation of a light beam, such as an infrared light beam, which is transmitted through a release liner.

Traditional SCK paper products available in the North American markets have a basis weight in the range of 64 to 66 g/m$^2$. The basis weight, as used herein, refers to the grammage of the paper, in grams per square meter. In theory, one option for the paper manufacturer to alleviate the shortage of raw material could be to simply reduce the basis weight of the paper upon manufacturing, whereby less amount of pulp would be consumed. To preserve the quality characteristics, however, the loss of fiber furnish would require compensation by calendering the paper more, which would lead into downgauging, that is, reduction of the paper thickness. A thinner paper having less basis weight would be a different product, in many aspects. A different die strike depth would likely be needed, for the die-cutting system. The paper product would no longer have the same properties as earlier, either, and the risk of inducing adverse effects downstream, when the paper is part of a release liner, is increased. The mechanical properties of the paper, such as surface smoothness, surface density and tearing resistance, may suffer to an extent that a release liner manufactured from such paper would not function properly, when exposed to the conditions present in a labelling process. This is of particular concern with papers having a low or very low basis weight to start with, typically in the range of 30-70 g/m$^2$, particularly in basis weight grades less than 50 g/m$^2$, wherein the relative tolerance levels set by the label converter due to the die-cutting systems are stricter. Glassine and SCK papers are examples of a high performance liner paper, defining a product type from which superior runnability and almost standardized target values are demanded, throughout the whole value chain.

Bleached chemithermomechanical pulp, denoted as BCTMP, offers a way to increase the bulk of the paper and to maintain the ratio between the basis weight and the thickness within a desired range. While this may reduce the basis weight, the risk remains that the produced paper does not meet the label converter's expectations in respect of other quality characteristics, when considering use as a substrate layer of an industrial release liner. BCTMP is high yield pulp manufactured by a hybrid process, wherein wood chips are first pre-treated with chemicals, heated for a short period and subsequently refined by mechanical means. This produces pulp having a yield typically in the range of 80 to 95 wt. %, wherein compounds other than cellulose present in the wood material have been preserved to a large extent. The properties of BCTMP thus differ from the properties of bleached chemical pulp, such as BKP. Controlling the density of the paper together with other quality characteristics at a higher production speed on a paper machine becomes more complex, when BCTMP is added. When the basis weight is reduced to a very low level, in particular to a level of less than 50 g/m$^2$, the production of a SCK paper for a release liner, which comprises BCTMP, however, becomes increasingly more difficult. The addition of BCTMP affects the mechanical and optical properties of the produced paper, such as transparency. The flaws of a produced paper, when considering suitability for release liner applications, may not become evident until the paper has already been manufactured and even siliconized, which would make the recycling of the product more difficult, as well.

SUMMARY

The invention solves the challenges disclosed above by providing a method for manufacturing supercalendered kraft paper, hereafter referred to as SCK paper, having a very low basis weight of less than 50 g/m$^2$, in particular between 30 and 50 g/m$^2$, wherein a combination of optimal amounts of bleached softwood kraft pulp, bleached hardwood kraft pulp and BCTMP is used to adjust the properties of the fiber furnish. The production of supercalendered kraft papers with very low basis weight is based on an understanding of the contribution which each type of pulp component brings to the fiber furnish and how the different components should be exploited, upon manufacturing SCK paper for a release liner having a basis weight of less than 50 g/m$^2$. Of particular notice are the relative shares of the bleached softwood kraft pulp, bleached hardwood kraft pulp and BCTMP in the fiber furnish, as the characteristics of bleached Kraft pulps differ significantly from the characteristics of BCTMP. By means of the relative shares of the pulp components the bulk of the formed paper web upon paper manufacturing may be controlled without downgauging and without adverse effects to other paper properties which would prevent its use as substrate layer of an industrial release liner for adhesive labels. In other words, by controlling the amount of bleached softwood kraft pulp and BCTMP a bulky kraft paper may be produced, wherein the fiber furnish enables supercalendering of the paper to typical target thickness used for corresponding supercalendered kraft paper grade having a higher basis weight, which therefore has a higher density. Thus a supercalendered kraft paper with relatively high share of BCTMP in the fiber furnish may be produced into a thickness range typical for higher basis weight products, while maintaining other quality characteristics of the paper sufficient for use as a substrate layer of an industrial release liner. Further to this, the manufacturing of SCK paper having a very low basis weight of less than 50 g/m$^2$ brings new challenges, due to the lower basis weight. The reduction of the basis weight, when implemented by changing the composition of fiber furnish, affects the amount of internal bonding between fibers that takes place upon formation of the paper web. This, in turn, has effects to the mechanical properties of the paper formed from the paper web, such as tensile strength and tear strength.

SCK paper is a distinguished type of paper that is used as a release liner substrate due to its outstanding characteristics. As disclosed above, SCK paper is typically produced of highly refined bleached chemical pulps from a kraft process. Bleached hardwood kraft pulp is hereafter abbreviated as BHKP. Bleached softwood kraft pulp is hereafter abbreviated as BSKP. The chemical cooking preserves the characteristics of the fibers in the pulp better in comparison to mechanical pulping methods, whereby the chemically pulped fibers may be better used for providing strength to the produced paper.

Bleaching, in turn, removes residual lignin still present after the chemical cooking operation, which increases the pulp whiteness and brightness. The whiteness of SCK is obtained without external dyes or colorants. A SCK paper typically contains a fiber furnish that includes both BSKP as well as BHKP. Different wood species produce different type of fibers, hence the origin of the pulp, in addition to the pulping method, may be used for adjusting the characteristics of the produced paper. For instance, BHKP in general is advantageous, in comparison to BCTMP, for the brightness and transparency of the product. The specifications of the produced paper may thus be altered by means of adjusting the share of pulp in a fiber furnish. The challenge, as indicated above, is that when the amount of a given pulp component is adjusted, it typically has an effect to several other paper characteristics. Thus, the dilemma lies in the multivariable optimization-how to improve desired paper characteristics without deteriorating others to the extent that the paper no longer meets the set quality specifications for the intended purpose.

SCK paper is manufactured on a paper machine by forming a paper web from selected pulp types which have been mixed together, such that a pulp mixture has been obtained. Automated optical analysis using unpolarized light may be used for determining the properties and fiber furnish of the pulp mixture, whereby for example fibers produced by chemical or mechanical pulping methods and their dimensions may be identified. The moisture content of the paper web is reduced in a press section, after which the paper web is dried in a drying section, whereby paper is formed. The ultimate properties of SCK paper manufactured at a paper machine, such as transparency and target thickness, are obtained by supercalendering, which is performed using a line pressure, heat and moisture content that are higher than conventionally used during an ordinary calendering treatment. Supercalendering enables to produce kraft paper having high density surface and high transparency. However, the level of compression used in calendering is less than is typically used for glassine paper, whereby the surface roughness is higher and the fiber structures of SCK paper are less damaged during the calendering. While SCK paper still displays excellent strength properties and relatively high transparency, it can be produced into technical specification ranges that are broader than allowed for glassine paper. Thus, SCK paper is not glassine paper. Moreover, the whiteness and brightness of SCK paper is due to the bleaching of the fibers, without added dyes or optical brightening agents, which also distinguishes it from glassine papers, which may be dyed. The method for manufacturing SCK paper is thus more pliable for changes, also in respect of fiber furnish compositions.

Considering the characteristics of highly refined BKP, the replacement of such BKP in a fiber furnish with BCTMP is not straightforward, should the mechanical and optical properties of the produced paper be maintained. As disclosed above, the manufacturing method of BCTMP differs from BKP. The two pulp types thus differ in many aspects. This can be seen in the mass of the particles in fiber length fractions in BCTMP, for instance. The distribution of the mass of the particles in fiber length fractions differs considerably from those in BHKP. It also differs significantly from the mass of the particles in fiber length fractions in BSKP. When considering the characteristics of BCTMP, the mass of the particles in shorter fiber length fractions, up to 1.2 mm in length, forms majority of the total mass, while in BSKP, the opposite seems to be the case. In BSKP, mass of the particles in longer fiber length fractions having a length equal to or higher than 1.2. mm appears to be dominant, when determined with Valmet Fiber Image Analyzer (Valmet FS5), implementing ISO 16065-2:2014, ISO 9184-4 and ISO 9184-1. This can also be seen in fiber length distribution of the BCTMP that differs considerably from fiber length distribution of the BHKP and particularly of the fiber length distribution of the BSKP. The gist thus lies in understanding how the underlying properties of the different type of pulps may be optimally used together in SCK paper to reduce the basis weight while preserving the thickness, in a way which prevents other relevant quality characteristics from falling out of specifications.

Experimental studies indicate that SCK paper having a low basis weight is exceptionally suitable for the adjustment of density with BCTMP. The results further indicate that SCK paper having a basis weight in the range of 50-70 g/m$^2$, and wherein the amount of BSKP is equal to or higher than 15 wt. % (SCAN P 39:80), enables very effective basis weight reduction, when BCTMP is used in an amount equal to or higher than 5 wt. % to replace BHKP. Uncalendered paper sheets, which contained BCTMP in the range of 5 to 50 wt. %, when determined as dry matter content of the paper, demonstrated a considerable increase of bulk. The uncalendered paper sheets, when exposed to conditions corresponding to industrial supercalendering, could also be calendered into the same thickness as corresponding industrial SCK papers, which contain only BHKP and BSKP. When the content of BCTMP was increased from 5 to 50 wt. %, the observed effect of BCTMP into the thickness of SCK paper was 4% in SCK paper having a basis weight of 58 g/m$^2$, 6% in SCK paper having a basis weight of 62 g/m$^2$, and 11% in SCK paper having a basis weight of 68 g/m$^2$. The combination thus enables to reduce the basis weight of the SCK paper, without downgauging.

The bulk increase obtainable when replacing BHKP with BCTMP is particularly interesting in SCK paper grades having a basis weight in the range of 50-70 g/m$^2$, and a density in the range of 1040 to 1140 kg/m$^3$, wherein the bulk may be flexibly controlled with the share of BCTMP in the fiber furnish, while using the share of BSKP to adjust other paper characteristics, such as tear strength of the paper. Further, the substitution of BHKP with BCTMP enables to maintain or even increase bending stiffness of the SCK paper, whereby a good potential to resist compression, which facilitates an even die strike pattern during a die-cutting operation, is obtainable. Advantageously, SCK paper having a basis weight in the range of 50-70 g/m$^2$ has a density in the range of 1040 to 1120 kg/m$^3$, preferably in the range of 1040 to 1100 kg/m$^3$, most preferably in the range of 1040 to 1080 kg/m$^3$. On this density range, the reduction in basis weight with BCTMP has been observed to have a particular cost advantage. Experimental results indicate that SCK paper containing a combination of BCTMP and BSKP, as disclosed above, still possesses a tear index higher than 5 mNm$^2$/g (ISO 1974), which is sufficiently high for use as a substrate layer of an industrial release liner for adhesive labels. The tear index in the cross direction of the paper is particularly advantageous, considering the use as a substrate layer in labelling processes. The fiber furnish composition in the basis weight in the range of 50-70 g/m$^2$ also facilitates to maintain a sufficient transparency of the supercalendered kraft paper. Experimental results from SCK paper specimens having said basis weight range of 50-70 g/m$^2$ indicate that a fiber furnish containing BCTMP in the range of 5 to 50 wt. %, when determined as dry matter content of the paper, may be supercalendered into a target thickness corresponding to similar kraft papers without BCTMP, while maintaining a transparency level of at least 40%, such as in the range of 40 to 56%.

However, experimental studies further indicate that SCK paper grades having a basis weight of less than 50 g/m$^2$ are more influenced by the characteristics of the BCTMP, both in respect of the manufacturing process as well as in respect of the properties of the formed SCK paper. When the basis weight of the paper web is less than 50 g/m$^2$, also the thickness of the formed SCK paper should be adjusted to less than 50 micrometers, to obtain a sufficient density for the SCK paper to facilitate the application of a subsequent release coating. The very low paper thickness, compared to SCK papers having similar fiber furnish but a higher basis weight above 50 g/m$^2$, is challenging, as the BCTMP present in the fiber furnish provides bulk which is desired but has a short average fiber length and is thus not well suited to preserve strength characteristics of the formed paper product. In SCK paper grades having a basis weight of less than 50 g/m$^2$, the tensile index appears to rapidly decrease as a function of the BCTMP content. Instead, the tearing strength of a SCK paper at the same basis weight grades was highly dependent of the content of BSKP in the composition of the fiber furnish. Moreover, the behaviour of the bonding of the fibers, which is relevant for the good formation of the paper web, was affected by the content of the BHKP in the fiber furnish. Experimental results indicate that an optimal amount of BCTMP in SCK paper grades having a basis weight of less than 50 g/m$^2$ is in a range of 10 to 20 wt. % of the fiber furnish, which enables the formation of sufficient density and still preserves sufficient strength characteristics in the formed paper web.

Therefore, when producing SCK paper grades having a basis weight between 30 and 50 g/m$^2$, the composition of the fiber furnish should be adjusted, in comparison to the SCK paper grades having a higher basis weight, as disclosed above. The adjustment of the fiber furnish of SCK paper grades having a very low basis weight by balancing the relative shares of BHKP, BSKP and BCTMP helps both to manufacture the SCK paper on a paper machine and to maintain sufficient quality of the produced SCK paper for use as a substrate layer of an industrial release liner, without downgauging.

Both BHKP and BCTMP contain more fines than BSKP, and may be used to reduce the surface roughness. BCTMP, however, in general contains a considerably higher proportion of fines than BSKP. Further, the composition of BCTMP may be optimized to facilitate the paper manufacturing process, as will be disclosed hereafter. To facilitate and improve the formation of the paper web at the wet end of the paper machine, however, the extent of substitution of BHKP by BCTMP should be considered. The higher the relative share of BCTMP is in the fiber furnish, the higher is the risk of web brakes, due to insufficient internal bonding of the fibers. The benefit of a higher share of BHKP in the fiber furnish was demonstrated in a mill trial of an SCK paper grade having a basis weight of less than 40 g/m$^2$, wherein the increase of the BHKP content in the fiber furnish was observed to have a positive effect on the formation of the paper web.

In particular, to improve runnability of the SCK paper manufacturing process of paper grades having a basis weight of less than 50 g/m$^2$, as well as to ensure sufficient tear strength of the SCK paper produced thereof, the fiber furnish should contain at least 25 wt. % of bleached softwood Kraft pulp. Further, to enable adequate formation of the paper web during the SCK paper manufacturing process, the fiber furnish should contain at least 55 wt. % of bleached hardwood kraft pulp. A higher total share of bleached hardwood kraft pulp in the fiber furnish also improves the structure and strength characteristics, such as the tear strength and tensile strength, of the produced SCK paper.

Hence, according to a first aspect and as indicated above, there is provided a supercalendered kraft paper suitable for use as a substrate layer of an industrial release liner for adhesive labels, the supercalendered kraft paper comprising

- a basis weight of less than 50 g/m$^2$, when determined by standard ISO 536, and
- a fiber furnish determinable with standard ISO 9184-4 in conjunction with standard ISO 9184-1, the fiber furnish comprising
  - bleached hardwood kraft pulp,
  - bleached softwood kraft pulp and
  - bleached chemithermomechanical pulp, such that the supercalendered kraft paper contains

- the bleached chemithermomechanical pulp in a range of 10 to 20 wt. % and the bleached softwood kraft pulp in an amount equal to or higher than 25 wt. %, when determined as dry matter content of the paper according to SCAN-P 39:80, the supercalendered kraft paper thereby having a transparency level equal to or higher than 40%, determinable by using the standard ISO 2469 and a density in the range of 1040 to 1200 kg/m$^3$, determinable by using the standard ISO 534.

Further, according to a second aspect and as indicated above, there is provided a method of manufacturing supercalendered kraft paper suitable for use as a substrate layer of an industrial release liner for adhesive labels, the method comprising mixing together bleached hardwood kraft pulp, bleached softwood kraft pulp, and bleached chemithermomechanical pulp such that a pulp mixture is obtained, which has a fiber furnish determinable with standard ISO 9184-4 in conjunction with the standard ISO 9184-1, forming a paper web from the pulp mixture on a paper machine, reducing moisture content of the paper web in a press section, drying the paper web in a drying section, thereby forming paper, and calendering the paper, such that a supercalendered kraft paper is obtained having a basis weight of less than 50 g/m$^2$, and which contains the bleached chemithermomechanical pulp in a range of 10 to 20 wt. % and the bleached softwood kraft pulp in an amount equal to or higher than 25 wt. %, when determined as dry matter content of the paper according to SCAN P 39:80, the supercalendered kraft paper thereby having a transparency level equal to or higher than 40%, determinable by using the standard ISO 2469 and a density in the range of 1040 to 1200 kg/m$^3$, determinable by using the standard ISO 534.

Further still, there is provided a release liner comprising a substrate layer and a release coating, wherein the substrate layer is a supercalendered kraft paper as indicated above, which comprises a primer coating applied on at least one side of the supercalendered kraft paper. The primer coating is typically a surface sizing applied in the range of 1 to 5 g/m$^2$ per side. The prime coating typically contains water-soluble polymers, such as starch, polyvinyl alcohol and/or carboxymethyl cellulose, which are compatible with addition-curing silicone systems used in release coatings.

Typically, the BCTMP comprises fibers from hardwood, the hardwood being a broadleaved tree, such as aspen, birch, maple or *eucalyptus*. Maple belongs to the genus *Acer*. Birch belongs to the genus *Betula. Eucalyptus* belongs to the genus *Eucalyptus*, comprising species such as *Eucalyptus globulus*. Aspen belongs to the genus *Populus*, comprising species such as *Populus tremuloides* and *Populus tremula*. Aspen is considered advantageous due to low yellowing of the fibers. Aspen fibers have a large specific surface that scatter light, which increases the brightness of a paper, but may reduce transparency. BCTMP from hardwood is advantageous for increasing the bulk of the fiber furnish. Advantageously, however, the BCTMP comprises fibers from softwood, the softwood being a coniferous tree, preferably from the genus *Picea, Abies, Larix* or *Pinus*, most preferably from *Picea*, such as *Picea abies* or *Pinus*, such as *Pinus strobus, Pinus palustris, Pinus lambertiana, Pinus taeda, Pinus monticola* or *Pinus poderosa*. BCTMP from softwood may be used for increasing the transparency of the fiber furnish. Advantageously, a BCTMP mixture comprising fibers from hardwood and softwood may be used to provide a pulp with balanced properties. A BCTMP mixture comprising fibers from hardwood and softwood may in particular be used to improve the manufacturing process conditions, upon producing the SCK paper. Advantageously, the share of softwood fibers in the BCTMP is in the range 10 to 60 wt. %, preferably in the range 15 to 50 wt. %, most preferably in the range of 20 to 40 wt. %, when determined as dry matter content of the BCTMP according to SCAN-P 39:80.

Typically, the BHKP fibers are from the genus *Betula, Acer, Populus* or *Eucalyptus*, such as *Populus tremuloides, Populus tremula* or *Eucalyptus globulus*, whereas the BSKP fibers are from the genus *Picea, Abies, Larix* or *Pinus*.

The properties of BCTMP may also be used to adjust other aspects of the fiber furnish, such as in the water retention capability of the fibers. Water retention value, abbreviated as WRV, is an empirical measure of the capacity of a pulp sample to hold water, determinable according to ISO 23714:2014(en). BCTMP made of hardwood such as aspen typically comprises a low water retention capability. The increase of the share of BCTMP in the pulp mixture, upon manufacturing SCK paper for a release liner, may be used to reduce the capacity of the pulp mixture to hold water. Thus, by adjusting the fiber furnish of the SCK paper with BCTMP, a WRV equal to or higher than 1.58 g/g, preferably equal to or higher than 1.60 g/g, most preferably equal to or higher than 1.84 g/g, may be obtained. A fiber furnish containing BCTMP in the range of 5 to 50 wt. % may be used to provide a pulp composition having WRV, which is in the range of 1.50 to 1.90 g/g, preferably in the range of 1.54 to 1.88 g/g, most preferably in the range of 1.58 to 1.84 g/g, from a sample having a dry matter content of 1 gram (ISO 23714:2014).

Advantageously, the characteristics of the BCTMP are also adjusted by refining, such that upon mixing, the bleached chemithermomechanical pulp has a Schopper-Riegler number, denoted as °SR, equal to or less than 60, such as in a range from 25 to 55, preferably in the range of 30 to 55, most preferably in the range of 40 to 50, when determined according to ISO 5267-1. Advantageously, the characteristics of the BSKP are also adjusted by refining, such that upon mixing, the BSKP has a Schopper-Riegler number, denoted as °SR, equal to or less than 60, such as in a range from 25 to 55, preferably in the range of 30 to 55, most preferably in the range of 40 to 50, when determined according to ISO 5267-1. Refining is a mill operation wherein the pulp fibers are subjected to high shear forces. This reduces the average fiber length of the pulp fibers, but also modifies the pulp fibers physically, for example by fibrillation, such that the fiber structures become looser. The Schopper-Riegler test measures the drainability of a pulp suspension in water. Advantageously, SCK paper having a basis weight of less than 50 g/m$^2$ has a fiber furnish, which has an average length weighted fiber length equal to or higher than 1.00 mm, preferably equal to or higher than 1.08 mm, most preferably equal to or higher than 1.13 mm, such as in the range of 0.95 to 1.16 mm, preferably in the range of 1.00 to 1.14 mm, most preferably in the range of 1.00 to 1.13 mm, when determined according to ISO 16065-2:2014. Refining of the pulp thus causes multiple effects downstream on the SCK paper manufacturing process. It produces shorter fibers which may be packed together closer, which enables to manufacture SCK paper having higher surface smoothness and surface density. However, refining also increases the moisture uptake of the pulp, which increases the amount of water to be removed from the formed paper web, in the press section and the drying section of a paper machine, which may cause dimensional changes and shrinkage of the SCK paper, and may also be seen in the paper quality, such as paper strength.

The manufacturing method of BCTMP also produces fibers, which in general differ from those obtained from kraft process. Hence, the amount of BCTMP in the fiber furnish also adjusts the average fiber width. Advantageously, the SCK paper has a fiber furnish, wherein the fiber furnish has an average fiber width of equal to or less than 25 micrometers, preferably in the range of 22 to 25 micrometers, most preferably in the range of 23 to 25 micrometers, when determined according to ISO 16065-2:2014.

Advantageously, SCK paper contains the BCTMP in an amount in the range of 10 to 20 wt. %, when determined as dry matter content of the paper according to SCAN-P 39:80. The share of BCTMP in the fiber furnish has an effect to the bulk of the uncalendered kraft paper, as well as to the bending stiffness of the supercalendered kraft paper. However, a higher BCTMP share also increases the roughness variation of SCK paper, which in the SCK paper grades having a basis weight of less than 50 g/m$^2$ can be countered by adjusting the share of the BHKP in the fiber furnish, which improves the formation of the paper web and provides smoothness. Advantageously, SCK paper containing BCTMP and having a basis weight of less than 50 g/m$^2$ contains bleached hardwood kraft pulp in an amount equal to or higher than 55 wt. %, such as in the range of 55 to 65 wt. %, preferably in the range of 55 to 60 wt. %, when determined as dry matter content of the paper according to SCAN-P 39:80.

The transparency of SCK paper, in general, is lower in paper grades, wherein the BCTMP content is higher. However, experimental results indicate that a SCK paper having a basis weight of less than 50 g/m$^2$, a density of at least 1040 kg/m$^3$ and which contains at least 55 wt. % of BKHP and at least 25 wt. % of BSKP, determined as dry matter content of the paper according to SCAN-P 39:80, may have a transparency of 60% or higher, which is sufficient for measuring brightness variation through a release liner by means of optical sensors and a light beam, such as an infrared light beam. The amount of BCTMP in the range of 10 to 20 wt. % of the fiber furnish is not detrimental to the optical characteristics of the SCK paper product in the very low basis weight SCK paper grades. The optimal combination of BHKP, BSKP and BCTMP thus enables a production of SCK paper having a basis weight of less than 50 g/m$^2$ wherein the optical quality is maintained sufficiently such that the paper is suitable for use as a substrate layer of a release liner. Advantageously, the SCK paper has a transparency in the range of 45 to 80%, preferably in the range of 50 to 75%, most preferably in the range of 55 to 70%, determinable by standard ISO 2469.

Advantageously, the SCK paper, as disclosed above, has a basis weight of less than 50 g/m$^2$, preferably less than 45 g/m$^2$, most preferably less than 40 g/m$^2$, such as between 30 and 50 g/m$^2$, preferably between 30 and 45 g/m$^2$, most preferably between 30 and 40 g/m$^2$, when determined according to ISO 536. Advantageously, the SCK paper, as disclosed above, has a density in the range of 1050 to 1200 kg/m$^3$, preferably in the range of 1050 to 1120 kg/m$^3$, most preferably in the range of 1050 to 1100 kg/m$^3$, when determined according to ISO 534.

Experimental studies further indicate that BSKP present in the fiber furnish of the SCK paper is highly advantageous for compensating the effects caused by the loss of average fiber length, due to BCTMP used to replace BHKP, as indicated above. When the SCK paper contains BSKP in an amount equal to or higher than 25 wt. %, when determined as dry matter content of the paper according to SCAN-P 39:80, an average length weighted fiber length equal to or higher than 1.08 mm is obtainable. When the SCK paper contains the BSKP in an amount equal to or higher than 30 wt. %, an average length weighted fiber length equal to or higher than 1.13 mm is obtainable. Advantageously, the SCK paper contains the BSKP in the range of 25 to 35 wt. %, preferably in the range of 30 to 35 wt. %, when determined as dry matter content of the paper according to SCAN-P 39:80.

Most advantageously, the SCK paper as disclosed above has a fiber furnish comprising BHKP in an amount equal to or higher than 55 wt. %, BSKP in an amount equal to or higher than 25 wt. %, and BCTMP in an amount equal to or higher than 10 wt. %, such that the total amount of bleached hardwood kraft pulp, bleached softwood kraft pulp and bleached chemithermomechanical pulp in the fiber furnish is 100 wt. %, when determined as dry matter content of the paper according to SCAN P 39:80, whereby the SCK paper has CIE L*, a*, b* colour space coordinate values, wherein L* is in the range of 92 to 98, a* is in the range of −4 to +2, and b* is in the range of +5 to +11, the values measured by means of diffuse reflectance method with the elimination of specular gloss, using standard illuminant D65 and 10° standard observer, in accordance with ISO 11475:2017(en).

Objects and embodiments of the invention are further described in the independent and dependent claims.

DETAILED DESCRIPTION

Figure 1:
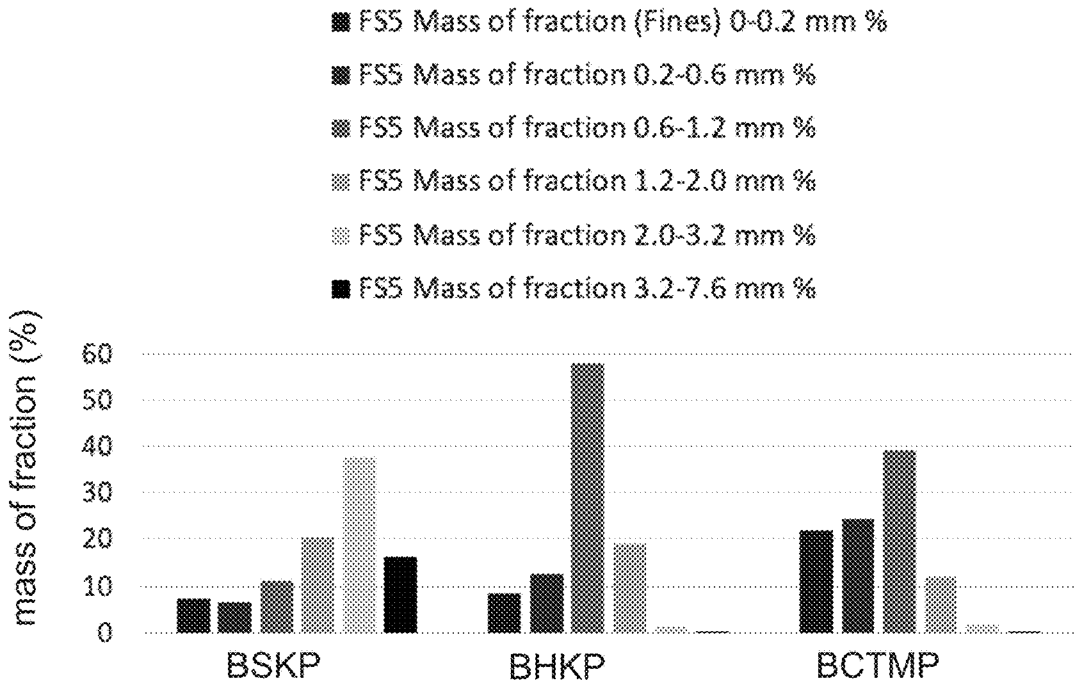
FIG. 1 is a diagram showing comparative data of the difference in average mass of fractions (relative share, %) between BCTMP, BHKP and BSKP, when determined with Valmet Fiber Image Analyzer (Valmet FS5), according to the manufacturer's instructions.

A Method for Manufacturing SCK Paper on a Paper Machine

SCK paper comprising BCTMP is manufactured on a paper machine from a pulp mixture comprising bleached chemical pulp from a kraft process. Typically, a pulp mixture for SCK paper comprises BSKP and BHKP. BCTMP may be used when the bulk of the formed paper is to be increased. The mixing of the pulps may be performed, for example by homogenising pulp mixture in a mixer. The amount of BCTMP in the pulp mixture with low basis weight grades of less than 50 $g/m^2$ may be varied, and is preferably in the range of 10 to 20 wt. %, when determined as dry matter content of the paper (SCAN P 39:80). BHKP, on the other hand, is advantageous for the brightness and transparency of the product. BSKP has a longer average fiber length than BHKP or BCTMP, and is therefore advantageous for the strength properties of the formed paper web. Typically, the pulps are refined, at a refining section of a paper machine prior to forming the pulp mixture. The pulps may be refined separately, where necessary.

A paper web for SCK is formed from the pulp mixture at a forming section of the paper machine. Typically, at a headbox of a paper machine, a pulp suspension having a consistency between 0.25 and 1 wt. % is used.

A weight percentage, abbreviated as wt. %, is used to describe a weight fraction of component in a composition. A weight percentage of pulp is used to describe a weight fraction of a pulp in a material. A weight percentage of pulp in a paper denotes the dry weight of the pulp in a dry paper, when determined according to SCANP-39:80 test method for dry matter content. The dry weight of a sample is determined by weighing 20 grams of sample on a dish before and after oven drying at 105° C. and eliminating the mass of the empty dish from the measurement. Oven dry pulp has been dried at 105° C. until its mass is constant and cooled thereafter in an exicator to ambient temperature of 25° C., prior to weighing.

The formed paper web is forced against the forming wire, to remove water, denoted as dewatering. Part of the fine particles present in the pulp suspension may flow through the wire, and are recycled back to the headbox via the short circulation. The amount of recycled fine particles defines a retention level, which describes the ability of the formed paper web to retain the fine particles on the web, and therefore the balance between drainage and formation of the paper web. The content of fine particles may be varied, for example, by selecting the pulp types and their relative shares in the pulp mixture, the wood species used for producing the pulps and by the extent of refining. An optimum retention level of the initially forming paper web enables drainage of water from the paper web such that the moisture content of the paper web may be controlled in the subsequent press and drying sections of the paper machine. The press section comprises a number of rolls for guiding and/or pressing the paper web. In the drying section, the paper web is heated to evaporate most of the remaining moisture in the paper web, thereby forming paper. After drying section, the formed paper typically has a dry content level equal to or more than 90 wt. %, for example in the range of 90 to 95 wt. %.

The finishing of the formed paper is done by surface sizing and calendering treatment. The ultimate properties of SCK paper, such as transparency and target thickness, are obtained by supercalendering, which is performed using a line pressure, heat and moisture content that are higher than conventionally used during an ordinary calendering treatment. The supercalendering of kraft paper is typically performed in a temperature in the range of 100 to 200° C. The line pressure used for supercalendering a kraft paper is generally in the range of 300 to 500 KN/m. Prior to supercalendering, the moisture content of the kraft paper may be elevated, for example by subjecting it to a spray of water or steam, such that upon supercalendering, the kraft paper has a dry content level less than 90 wt. %, such as in the range of 75 to 90 wt. %. Supercalendering enables to produce kraft paper having high density surface and high transparency. The surface of the supercalendered kraft paper is typically sized with a water-soluble polymer or a mixture of polymers in an amount ranging from 1 to 5 $g/m^2$. Examples polymers used for surface sizing are water-soluble polyvinyl alcohol, starch and carboxymethyl cellulose. The surface sizing may be used for improving the surface denseness and to enhance the barrier properties. The surface sizing may further be used for optimizing the compatibility of the surface to a subsequent release coating.

The composition of the pulp mixture upon manufacturing SCK paper may thus be used for adjusting the properties of the fiber furnish, thereby enabling formation of a paper, which may be further treated by supercalendering such that predefined properties, such as sufficient transparency and target thickness are achieved.

BCTMP for SCK Paper

The characteristics of the BCTMP for the SCK paper production may be evaluated, for instance, based on the bulk, brightness, pH and drainability of the pulp. Advantageously the bulk of the BCTMP is equal to or higher than 1.8 $cm^3/g$, preferably at least 2.0 $cm^3/g$, such as in the range of 1.8 to 3.2 $cm^3/g$, when determined according to ISO 534. Advantageously the brightness of the BCTMP is equal to or higher than 60%, preferably equal to or higher than 80%, such as in the range of 60 to 85%, when determined according to ISO 2470.

BCTMP for SCK paper, as disclosed herein, may be manufactured by a hybrid process wherein wood chips are first pretreated with chemicals, heated for a short period and subsequently refined by mechanical means. When the wood chips are pretreated in a higher pH, preferably by impregnating the wood chips with chemicals, the internal bonding of the fibers may be reduced, such that the specific volume of the formed chemithermomechanical pulp may be increased. The pH during the chemical impregnation treatment is typically above 7 and thus the treatment is alkaline. The pH environment experienced by the wood chips may be, for example in the range of pH 7 to 11, advantageously in the range of pH 7 to 9. By increasing the pH of the chemical impregnation treatment, the duration of the chemical impregnation treatment and the duration of the subsequent heating, preferably by steam, the bulkiness of the formed chemithermomechanical pulp may be increased such that less amount of refining may be required for providing the desired water retention value and fiber length distribution. When high intensity refining is used upon producing BCTMP, less energy is needed for the fibrillation of the fibers. Thus, the amount of short fibers, such as fine particles, in the BCTMP may be increased, which increases the bulk. These short fibers are beneficial for reducing the basis weight of a paper.

BCTMP comprising fibers from both hardwood and softwood may have a higher pH value than BCTMP comprising fibers from only hardwood. The presence of fibers from softwood may also be arranged to protect the hardwood fibers during mechanical refining of the BCTMP. For example, a BCTMP mixture of both aspen and spruce has been noticed to refine less than when the components are refined separately in the same conditions. The manufacturing process of BCTMP may also be improved by adjusting the pH and extent of refining, such that BCTMP having a desired water retention value and fiber length distribution is obtained.

In addition to the Schopper-Riegler test disclosed above, Canadian Standard Freeness (hereafter denoted as CSF) may be used to determine the drainability of a pulp suspension, in units of millilitres (ml). Preferably, upon mixing, the bleached chemithermomechanical pulp advantageously has a Canadian Standard Freeness (hereafter denoted as CSF) value of equal to or more than of 90 ml, such as in the range of 90 to 500 ml and the pH of aqueous extracts equal to or above pH 7.0, preferably a CSF value equal to or more than 130 ml, such as in the range of 130 to 425 ml and the pH of aqueous extracts equal to or above pH 7.1, most preferably a CSF value equal to or more than 325 ml, such as in the range of 325 to 435 ml and the pH of aqueous extracts equal to or above pH 7.3. The Canadian Standard Freeness value may be determined in accordance with ISO 5267-2:2001. The pH of the pulp may be determined from aqueous pulp extracts according to ISO 6588-2 (2020). The pulp pH is measured from an aqueous extract having a temperature in the range of 20 to 25° C., by means of a pH meter, using two buffer solutions having pH 4 and pH 7, respectively. Suitable pH meters are, for example, pH-meter CG 840 with electrode N 1042A, Knick pH-meter 766 Calimatic with electrode SE 103 or Mettler-Toledo MP 120, used according to the manufacturer's instructions.

EXPERIMENTAL STUDIES

Reference is made to FIGS. 1-9 and to experimental sections A and B discussed hereafter. Experimental studies disclosed in these sections were carried out to characterize BCTMP, BSKP and BHKP and to assess the significance of the relative share of these pulps in a fiber furnish of SCK paper. Section A demonstrates the dependencies of various pulp components on SCK papers having a basis weight in the range of 50-70 g/m$^2$. Section B demonstrates the importance of the fiber furnish composition in the manufacturing of SCK paper having a very low basis weight of less than 50 g/m$^2$. Of particular interest was the dependency of the relevant quality characteristics of the SCK paper on the relative share of these pulps in the very low basis weight grade SCK papers. A specific aim was to investigate by means of simulation, after experimental trials on a paper machine, how the adjustment of the fiber furnish composition of SCK papers having a very low basis weight of less than 50 g/m$^2$ would affect the formation and runnability of the production at a paper machine and which type of adjustments would least interfere with SCK paper quality characteristics and preserve the usability of the SCK paper as substrate layer of an industrial release liner for adhesive labels.

Experimental Section A

An experimental setup was thus designed wherein the relationship between BCTMP, BSKP and BHKP in fiber furnishes of SCK papers having a basis weight in the range of 50-70 g/m$^2$ could be studied in SCK paper specimens, wherein the fiber furnish was varied both as a function of the content of BSKP as well as a function of the content of the BCTMP.

The experimental setup contained several trial points TP1 to TP9, wherein the trial points were divided into three groups, based on whether the share of BSKP was less than 20 wt. %, equal to or higher than 20 wt. % or equal to or higher than 30 wt. %. In the first group, the content of BSKP was either 15 wt. % (TP7, TP8) or 18 wt. % (TP9). In the second group, the content of BSKP was 22.5 wt. % (TP4, TP5, TP6). In the third group the content of BSKP was 30 wt. % (TP1, TP2, TP3).

To obtain more information of the underlying dependencies, the number of data points in each trial point TP1 to TP9 was increased by producing SCK paper specimens in three different basis weight of 58, 62 and 68 g/m$^2$. Within each group, a trial point with higher BCTMP content was produced by increasing the share of BCTMP and reducing the share of BHKP, as indicated in table 1 (below). Hence, the addition of BCTMP was performed as a replacement such that the relative amount of BHKP in the fiber furnish was reduced.

TABLE 1

SCK paper specimen trial points TP1 to TP9 used in the experimental study. The weight percentages indicate the relative share of each pulp component in the fiber furnish.

| Trial point | BSKP (wt. %) | BHKP (wt. %) | BCTMP (wt. %) |
|---|---|---|---|
| TP1 | 30 | 65 | 5 |
| TP2 | 30 | 55 | 15 |
| TP3 | 30 | 45 | 25 |
| TP4 | 22.5 | 47.5 | 30 |
| TP5 | 22.5 | 42.5 | 35 |
| TP6 | 22.5 | 37.5 | 40 |
| TP7 | 15 | 40 | 45 |
| TP8 | 15 | 35 | 50 |
| TP9 | 18 | 72 | 10 |

SCK paper specimens for the trial points TP1 to TP9 used in the experimental study were prepared according to the ISO 5269-3 (2008) standard, using a conventional sheet-former method as described in ISO 5269-1 (2005), wherein a closed water system was used. The pulps were refined to levels typically used in SCK paper production. BCTMP refining was performed with a (Voith-Sulzer) laboratory refiner at 4% pulp consistency that corresponds well to mill refining and the °SR determined according to ISO 5267-1 (1999). The BCTMP was refined to a target °SR-value 45. The BSKP was refined to a target °SR 20-35 at a paper mill and the BHKP was refined to a target °SR 30-45 at a paper mill as well. After dewatering and drying the formed kraft paper specimens were conditioned overnight (relative humidity 90%, temperature +23° C.±2° C.). The kraft paper specimens were calendered in conditions of 100° C. roll temperature, 4000 dN pressure, using 2 passes, which produced specimens corresponding to industrial supercalendered kraft paper and having a target thickness typical for the respective basis weight.

Example A1—Comparison of Fiber Fractions and Average Dimensions

The fiber properties were analysed from the pulps used in the SCK paper specimens as well as from the fiber furnishes by means of Valmet Fiber Image Analyzer (Valmet FS5), which is an example of a device, which can be used according to the manufacturer's instructions to perform the fiber furnish analysis. A fiber furnish analysis is capable of identifying papermaking fibers from a sample. Another example of a fiber furnish analysis is the Graff "C" stain test according to ISO 9184-4:1990(en), in conjunction with ISO 9184-1 and, if necessary, ISO 9184-2, wherein the wood species used in a pulp may be distinguished by comparison method, wherein a sample fiber is compared against a known reference fiber.

Valmet Fiber Image Analyzer (Valmet FS5) may further be used for an analysis of fiber dimensions, such as fiber length and fiber width, as well as to quantify fiber fractions, such as mass of fractions and length weighted fiber length distributions of a sample, by means of automated optical analysis using unpolarized light, according to ISO 16065-2:2014. The analysis is based on an ultra high resolution (UHD) camera system equipped with image analysis software, which is used to acquire a greyscale image of a sample, of which image the properties of the fibers in the sample may be determined. The greyscale image is acquired from a sample placed in a transparent sample holder, such as a cuvette, using a 0.5 millimetre depth of focus according to ISO 16505-2 standard.

The pulp types used in the study were characterised based on their fiber properties. Below are listed the pulp types and their abbreviation in the experimental study:

| | |
|---|---|
| BSKP | northern bleached softwood kraft pulp (*Picea*, *Pinus*) |
| BHKP | bleached hardwood kraft pulp (*Betula*) |
| BCTMP | bleached chemithermomechanical pulp (*Populus*, 75 wt. %) and spruce (*Picea*, 25 wt. %) |

Reference is made to FIG. 1 and Table 2 (below), which show comparative data of the determined mass of fiber length fractions of BSKP, BHKP and BCTMP.

TABLE 2

Comparative data of mass of fiber length fractions according to fiber length in BSKP, BHKP and BCTMP.

| Fiber fraction | BSKP | BHKP | BCTMP |
|---|---|---|---|
| <0.2 mm (fines) | 7.4% | 8.7% | 22.1% |
| 0.2 < 0.6 mm | 6.5% | 12.6% | 24.5% |
| 0.6 < 1.2 mm | 11.2% | 58.2% | 39.4% |
| 1.2 < 2.0 mm | 20.7% | 19.1% | 11.9% |
| 2.0 < 3.2 mm | 37.9% | 1.4% | 1.7% |
| 3.2 < 7.6 mm | 16.2% | 0.1% | 0.4% |

The fiber mass fraction analysis was performed with Valmet Fiber Image Analyzer (Valmet FS5), using fiber length weighted distribution for classifying the fibers, according to the manufacturer's instructions and implementing ISO 16065-2:2014, ISO 9184-4 and ISO 9184-1. In the analysis,

- fines were defined to be particles having a width over 10 micrometers and a length of less than 0.2 millimeters, and
- fibers were defined to be particles having a width in the range of 10 to 75 micrometers and a length above 0.2 millimeters.

As demonstrated by FIG. 1 and table 2 (above), the mass fraction distribution of BCTMP sample differs considerably from the mass fraction distributions of the two BKP samples. In the BCTMP sample, the mass of the shorter fiber fractions, up to 1.2 mm in length, forms 86% of the total mass, while in BSKP, the opposite is the case. In BSKP, close to 75% of the mass is in fractions having a length equal to or higher than 1.2. mm. In comparison, in BHKP, only 20.6% of the mass is in fractions having a length equal to or higher than 1.2. mm, while in BCTMP only 14% of the mass is in fractions having a length equal to or higher than 1.2. mm. Hence, most of the mass of BCTMP is in particles having a small average fiber length.

When analysing the number of fibers in each fraction, on the other hand, it was observed that most of the fiber distribution in the BCTMP were in the shortest fractions, whereas in BSKP, the distribution was much more even, as indicated by table 3 (below).

TABLE 3

Comparative data of number of fibers in a fraction according to fiber length in BSKP, BHKP and BCTMP.

| Fiber component | BSKP | BHKP | BCTMP |
|---|---|---|---|
| FS5 Fiber fractions (Fines) 0-0.2 mm % | 17.7% | 14.0% | 37.3% |
| FS5 Fiber fractions 0.2-0.6 mm % | 11.0% | 12.9% | 25.7% |
| FS5 Fiber fractions 0.6-1.2 mm % | 12.8% | 56.5% | 29.5% |
| FS5 Fiber fractions 1.2-2.0 mm % | 18.7% | 15.8% | 6.5% |
| FS5 Fiber fractions 2.0-3.2 mm % | 29.1% | 0.8% | 0.8% |
| FS5 Fiber fractions 3.2-7.6 mm % | 10.9% | 0.0% | 0.2% |

As an interim of the results above, the differences of the fiber analysis highlight that the origin of the pulp as well as the pulping method may be used to adjust the characteristics of the produced SCK paper.

Figure 2:
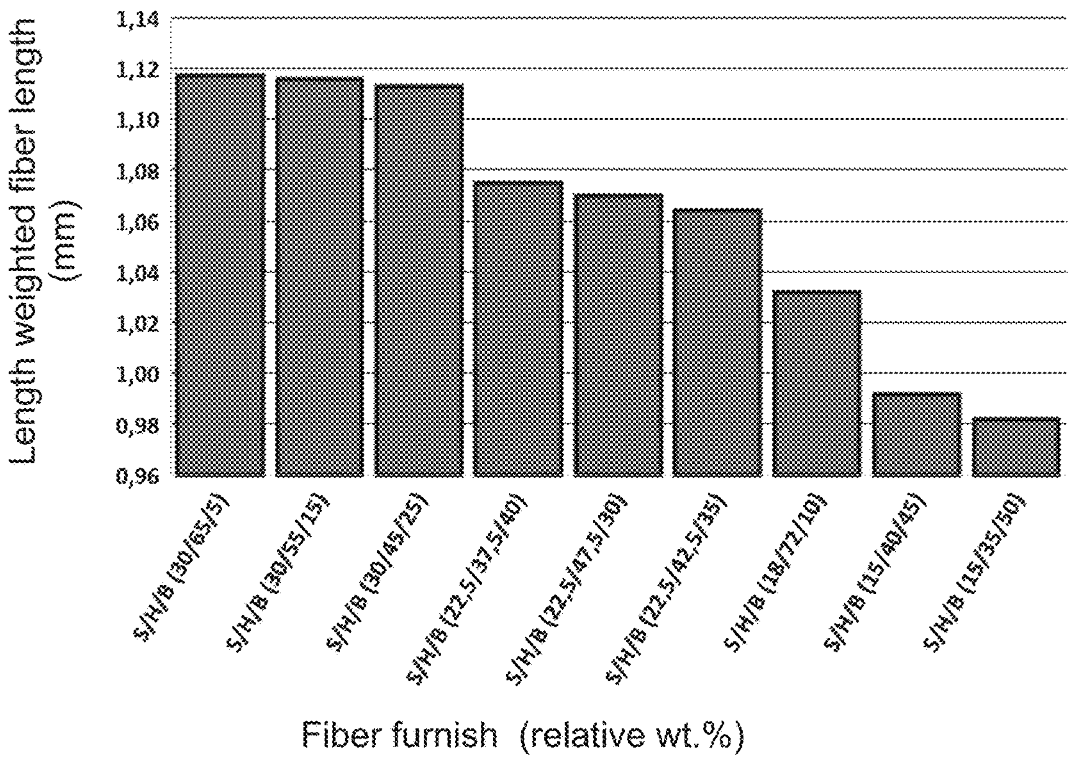
FIG. 2 is a diagram showing the effect of BSKP to average length weighted fiber length (mm) in SCK papers having different fiber furnishes.

Reference is made to FIG. 2 and to table 4 (below), which present the length weighted fiber length in millimeters determined form the SCK paper specimens (trial points TP1-TP9) in the experimental study. The diagram in FIG. 2 shows the advantageous effect of BSKP to the average fiber length in SCK paper. When the share of BSKP was 15 wt. %, the average length weighted fiber length of the fiber furnish was less than 1 mm. Further, when the SCK paper contained BSKP in an amount equal to or higher than 20 wt. %, when determined as dry matter content of the paper according to SCAN-P 39:80, an average length weighted fiber length equal to or higher than 1.03 mm is obtainable. Hence, when the share of BSKP was increased to be higher than 15 wt. %, such as equal to or higher than 20 wt. % or equal to or higher than 30 wt. %, the average length weighted fiber length of the fiber furnish increased significantly. A clear difference can be observed between the three groups in the trial. This was the case, since the increase was present within groups having a higher share of BSKP, regardless of the content of the BCTMP in the fiber furnish. The results therefore demonstrate a high dependency of the average fiber length to the content of BSKP in the fiber furnish, in SCK papers with low basis weight.

TABLE 4

Comparative data of the effect of BSKP to the average fiber length in SCK papers with low basis weight.

| Trial point | Fiber furnish | Length weighted fiber length (mm) |
|---|---|---|
| TP1 | S/H/B (30/65/5) | 1.12 |
| TP2 | S/H/B (30/55/15) | 1.12 |
| TP3 | S/H/B (30/45/25) | 1.11 |
| TP4 | S/H/B (22.5/47.5/30) | 1.07 |
| TP5 | S/H/B (22.5/42.5/35) | 1.06 |

TABLE 4-continued

Comparative data of the effect of BSKP to the average fiber length in SCK papers with low basis weight.

| Trial point | Fiber furnish | Length weighted fiber length (mm) |
|---|---|---|
| TP6 | S/H/B (22.5/37.5/40) | 1.08 |
| TP7 | S/H/B (15/40/45) | 0.99 |
| TP8 | S/H/B (15/35/50) | 0.98 |
| TP9 | S/H/B (18/72/10) | 1.03 |

Example A2—Effect of BCTMP Content to the Bulk in the SCK Paper Specimens

To evaluate the effect of BCTMP addition in SCK papers with low basis weight, the bulk of the produced uncalendered paper sheets, in each of the trial points TP1 to TP9, was determined. The results are presented in table 5 (below). The bulking thickness therein refers to the thickness of the uncalendered paper, determined as single sheet thickness according to ISO 534:2011. The apparent bulk density therein refers to the mass per unit volume of the uncalendered paper, which is expressed in kilograms per cubic meters (kg/m$^3$). The apparent bulk density has been calculated from a single sheet thickness according to ISO 534:2011. The bulk, as used therein, refers to the volume per unit mass, expressed in cubic centimeters per gram (cm$^3$/g). The bulk therefore represents the inverse of the paper density.

TABLE 5

Comparative data of the effect of BCTMP to the bulk of uncalendered SCK papers with low basis weight.

| Trial point | Fiber furnish | Basis weight (g/m$^2$) | Bulking thickness (μm) | Apparent bulk density (kg/m$^3$) | Bulk (cm$^3$/g) |
|---|---|---|---|---|---|
| TP1 | S/H/B (30/65/5) | 57.5 | 78 | 736 | 1.36 |
| | S/H/B (30/65/5) | 60.6 | 82 | 737 | 1.36 |
| | S/H/B (30/65/5) | 67.6 | 90 | 753 | 1.33 |
| TP2 | S/H/B (30/55/15) | 58.2 | 80 | 724 | 1.38 |
| | S/H/B (30/55/15) | 62.0 | 85 | 726 | 1.38 |
| | S/H/B (30/55/15) | 68.3 | 94 | 730 | 1.37 |
| TP3 | S/H/B (30/45/25) | 58.7 | 84 | 699 | 1.43 |
| | S/H/B (30/45/25) | 62.0 | 87 | 709 | 1.41 |
| | S/H/B (30/45/25) | 68.1 | 95 | 714 | 1.40 |
| TP4 | S/H/B (22.5/47.5/30) | 58.6 | 86 | 683 | 1.46 |
| | S/H/B (22.5/47.5/30) | 62.4 | 90 | 697 | 1.44 |
| | S/H/B (22.5/47.5/30) | 68.0 | 96 | 711 | 1.41 |
| TP5 | S/H/B (22.5/42.5/35) | 57.7 | 86 | 675 | 1.48 |
| | S/H/B (22.5/42.5/35) | 62.0 | 91 | 684 | 1.46 |
| | S/H/B (22.5/42.5/35) | 68.1 | 99 | 685 | 1.46 |
| TP6 | S/H/B (22.5/37.5/40) | 58.6 | 88 | 666 | 1.50 |
| | S/H/B (22.5/37.5/40) | 62.1 | 93 | 668 | 1.50 |
| | S/H/B (22.5/37.5/40) | 68.4 | 101 | 679 | 1.47 |
| TP7 | S/H/B (15/40/45) | 58.3 | 89 | 652 | 1.53 |
| | S/H/B (15/40/45) | 62.3 | 95 | 655 | 1.53 |
| | S/H/B (15/40/45) | 68.1 | 102 | 668 | 1.50 |
| TP8 | S/H/B (15/35/50) | 58.3 | 91 | 644 | 1.55 |
| | S/H/B (15/35/50) | 62.2 | 95 | 653 | 1.53 |
| | S/H/B (15/35/50) | 68.3 | 104 | 657 | 1.52 |
| TP9 | S/H/B (18/72/10) | 58.2 | 82 | 714 | 1.40 |
| | S/H/B (18/72/10) | 62.0 | 85 | 728 | 1.37 |
| | S/H/B (18/72/10) | 67.5 | 92 | 735 | 1.36 |

The results demonstrate that the bulking thickness may be adjusted significantly as a function of the BCTMP content in the fiber furnish. The results also evidence that SCK papers with low basis weight, particularly in the range of 50-70 g/m$^2$, are exceptionally suitable for the adjustment of density with BCTMP. This was observed throughout the studied range of 5 to 50 wt. % of BCTMP additions to the fiber furnish, determined as dry matter content of the paper (SCAN P 39:80). Thus, a considerable increase of bulk was obtainable. The obtained increase in the bulk enabled supercalendering of the paper sheets into the same thickness as corresponding SCK papers, which contain only BHKP and softwood, while maintaining a lower density than in the corresponding SCK papers, due to the obtained increase of bulk.

Example A3—Comparison of Water Retention Value in the in SCK Paper Specimens

The SCK paper specimens in trial points TP1 to TP9 were also characterized in respect of their water retention value, abbreviated as WRV, according to ISO 23714:2014(en). WRV is an empirical measure of the capacity of a pulp sample to hold water. The WRV was determined as an average of two parallel samples, each sample amount consisting of 1 g of dry pulp diluted into 500 ml of water and having a temperature of 23±3° C. Materials and methods as listed below were used:

Beckman Coulter Avanti J-301 laboratory centrifuge

Centrifugal force of 3000 g±50 g, 30 minutes

JS 7.5 rotor (speed 5350; RPM 5289)

The sample was weighed first time after the centrifugation. The sample was then dried overnight (12 h) at 105±2° C. and cooled down to a room temperature of 23±3° C. in an excicator. The sample was then weighed a second time. A laboratory scale (0,0001 g precision) was used for the weighing.

The water retention value was calculated according to equation 1 below:

$$WRV = \frac{m1}{m2} - 1, \qquad \text{Equation 1}$$

wherein $m1$ = mass of sample after centrifugation, in grams $m2$ = mass of sample after drying, in grams.

The results in table 6 (below) indicate that when the share of BSKP in the pulp mixture is reduced to 15 wt. % of the fiber furnish, while keeping the share of BCTMP high, a drop in the WRV is perceived. Hence, upon manufacturing SCK paper for a release liner, a minimum amount of BSKP equal to or higher than 15 wt. % should be used, to prevent fluctuation of the WRV level. Further, when the amount of BSKP in the fiber furnish is above the minimum amount, the amount BCTMP content may be varied significantly, in the range of 5 to 50 wt. %, without corresponding alteration in the capacity of the pulp mixture to hold water. Thus, when producing SCK paper, an optimum range exists, wherein the amount of BSKP may be arranged to interact with the amount of BCTMP in the fiber furnish. When studying the WRV of the unmixed pulps used for the fiber furnish, it was observed that WRV of the BSKP was the highest, 1.84 g/g. The WRV of BHKP was 1.60 g/g, which was on a comparable level with the BCTMP, having a WRV of 1.58 g/g.

TABLE 6

Comparative data of water retention values in SCK paper specimens of the experimental study, wherein the relative share of BSKP, BHKP and BCTMP was varied.

| Sample | Fiber furnish | WRV (g/g) |
|---|---|---|
| TP1 | S/H/B (30/65/5) | 1.65 |
| TP2 | S/H/B (30/55/15) | 1.69 |
| TP3 | S/H/B (30/45/25) | 1.66 |
| TP4 | S/H/B (22.5/47.5/30) | 1.65 |
| TP5 | S/H/B (22.5/42.5/35) | 1.67 |
| TP6 | S/H/B (22.5/37.5/40) | 1.67 |
| TP7 | S/H/B (15/40/45) | 1.63 |
| TP8 | S/H/B (15/35/50) | 1.62 |
| TP9 | S/H/B (18/72/10) | 1.67 |

Example A4—Effect of BCTMP and BSKP Combination for SCK Paper Quality Criteria To study the combined effect of BSKP and BCTMP in the fiber furnish in respect of the quality specifications for SCK papers, the uncalendered papers, as disclosed above, were supercalendered, using target thicknesses in the range of 51 to 61 micrometers, which are typical for SCK papers in the range of 58 to 68 g/m$^2$. Paper specimens having a basis weight of 58 g/m$^2$ were supercalendered into a thickness in the range of 51 to 53 micrometers. Paper specimens having a basis weight of 62 g/m$^2$ were supercalendered into a thickness in the range of 52 to 56 micrometers. Paper specimens having a basis weight of 68 g/m$^2$ were supercalendered into a thickness in the range of 57 to 61 micrometers. The average density of the prepared supercalendered kraft paper specimens was 1127±17 kg/m$^3$, the latter number indicating the standard deviation.

Tensile, bending and tear strength properties, as well as optical properties of the prepared SCK paper specimens were determined to evaluate the suitability of the produced SCK paper for use as a substrate layer of an industrial release liner. Tensile index refers to the tensile strength divided by the basis weight, determinable according to standard ISO 1924-3:2005(en), in units of Newton meter per gram. Tensile index is indicative of the strength of the paper derived from factors such as fiber strength, fiber length, and bonding. It can also be used as an indication of the potential of a paper substrate to resist web breaking during a labelling operation. Bending stiffness refers to the potential of a paper to resist bending caused by a given applied force and is determinable according to standard ISO 5628:2019(en), in units of milliNewton meters (mNm). Bending stiffness has been observed to be also indicative of the compressibility of the paper and may thus be used to assess the potential of a paper to resist compression, for instance upon a die-cutting operation, if the paper is used as a substrate layer of a release liner for adhesive labels. Tear index refers to the tearing strength of a paper divided by its basis weight, determinable according to ISO 1974, and is expressed in units of milliNewtons divided by grams per square meters (mNm$^2$/g). Tear index is indicative of the resistance of a paper to a tearing force that it is subjected to, which is a quality characteristic for a paper used as a substrate layer of an industrial release liner. It can be measured in machine direction (MD) or cross direction (CD) of a paper, the machine direction referring to the travelling direction of the paper on a paper machine. Table 7 (below) indicates the results of the strength and optical properties determined from the prepared supercalendered kraft paper specimens.

TABLE 7

Results concerning the density, strength and optical properties of the prepared SCK paper specimens in trial points TP1 to TP9. In each trial point, paper specimens were produced into three different basis weight of 58, 62 and 68 g/m$^2$. When considered together, the value ranges determined from the SCK paper specimens for density, tensile index, bending stiffness, tear index, as well as transparency indicate suitability for use as a substrate layer of a release liner.

| Trial point | Fiber furnish | basis weight (g/m$^2$) | density (kg/m$^3$) | Tensile index (Nm/g) | Bending stiffness (mNm) | Tear index (mNm$^2$/g) | Transp. (%) |
|---|---|---|---|---|---|---|---|
| TP1 | S/H/B (30/65/5) | 58 | 1142 | 84 | 1.0 | 6.4 | 52 |
| | S/H/B (30/65/5) | 62 | 1151 | 82 | 1.1 | 6.7 | 51 |
| | S/H/B (30/65/5) | 68 | 1165 | 79 | 1.5 | 7.0 | 49 |
| TP2 | S/H/B (30/55/15) | 58 | 1136 | 76 | 0.9 | 6.3 | 51 |
| | S/H/B (30/55/15) | 62 | 1137 | 77 | 1.2 | 6.7 | 49 |
| | S/H/B (30/55/15) | 68 | 1146 | 79 | 1.5 | 6.8 | 48 |
| TP3 | S/H/B (30/45/25) | 58 | 1128 | 72 | 0.9 | 6.1 | 50 |
| | S/H/B (30/45/25) | 62 | 1134 | 72 | 1.1 | 6.3 | 50 |
| | S/H/B (30/45/25) | 68 | 1141 | 75 | 1.4 | 6.5 | 49 |
| TP4 | S/H/B (22.5/47.5/30) | 58 | 1134 | 72 | 1.0 | 6.2 | 49 |
| | S/H/B (22.5/47.5/30) | 62 | 1134 | 71 | 1.2 | 6.1 | 49 |
| | S/H/B (22.5/47.5/30) | 68 | 1144 | 69 | 1.5 | 6.3 | 48 |
| TP5 | S/H/B (22.5/42.5/35) | 58 | 1112 | 68 | 1.0 | 5.6 | 51 |
| | S/H/B (22.5/42.5/35) | 62 | 1112 | 70 | 1.2 | 5.9 | 48 |
| | S/H/B (22.5/42.5/35) | 68 | 1116 | 69 | 1.5 | 6.0 | 47 |
| TP6 | S/H/B (22.5/37.5/40) | 58 | 1097 | 65 | 1.0 | 5.7 | 48 |
| | S/H/B (22.5/37.5/40) | 62 | 1112 | 69 | 1.2 | 5.6 | 50 |
| | S/H/B (22.5/37.5/40) | 68 | 1126 | 67 | 1.4 | 5.9 | 47 |
| TP7 | S/H/B (15/40/45) | 58 | 1099 | 62 | 1.0 | 5.4 | 47 |
| | S/H/B (15/40/45) | 62 | 1111 | 66 | 1.2 | 5.6 | 46 |
| | S/H/B (15/40/45) | 68 | 1114 | 66 | 1.5 | 5.9 | 45 |
| TP8 | S/H/B (15/35/50) | 58 | 1105 | 63 | 1.0 | 5.3 | 48 |
| | S/H/B (15/35/50) | 62 | 1108 | 62 | 1.1 | 5.4 | 47 |
| | S/H/B (15/35/50) | 68 | 1116 | 62 | 1.5 | 5.5 | 46 |

TABLE 7-continued

Results concerning the density, strength and optical properties of the prepared SCK paper specimens in trial points TP1 to TP9. In each trial point, paper specimens were produced into three different basis weight of 58, 62 and 68 g/m$^2$. When considered together, the value ranges determined from the SCK paper specimens for density, tensile index, bending stiffness, tear index, as well as transparency indicate suitability for use as a substrate layer of a release liner.

| Trial point | Fiber furnish | basis weight (g/m$^2$) | density (kg/m$^3$) | Tensile index (Nm/g) | Bending stiffness (mNm) | Tear index (mNm$^2$/g) | Transp. (%) |
|---|---|---|---|---|---|---|---|
| TP9 | S/H/B (18/72/10) | 58 | 1131 | 75 | 0.9 | 6.3 | 51 |
| | S/H/B (18/72/10) | 62 | 1145 | 76 | 1.2 | 6.5 | 50 |
| | S/H/B (18/72/10) | 68 | 1146 | 79 | 1.4 | 6.6 | 49 |

When reviewing the results of table 7 above, moderate decrease can be seen in the tensile index and tear index levels in the trial points TP1 to TP9, as the amount of BCTMP in the fiber furnish is increased. However, even when the amount of BHKP in the fiber furnish was reduced significantly by means of BCTMP replacement from 72 wt. % in TP9 to 35 wt. % in TP8, a paper having sufficient strength characteristics for a substrate layer of a release liner could still be obtained, presenting a tear index higher than 5 mNm$^2$/g and a tensile index higher than 60 Nm/g. A relatively high and sufficient transparency could also be obtained, regardless of the basis weight produced, at a desired target thickness level, which enables the use of optical sensors to measure brightness variation. In particular, as indicated by the results above, the bending stiffness was also maintained and even slightly increases as a function of BCTMP content in the fiber furnish, when the SCK paper contains BCTMP in an amount in the range of 5 to 50 wt. % and BSKP in an amount equal to or higher than 15 wt. %, when determined as dry matter content of the paper according to SCAN P 39:80. Thus, the substitution of BHKP with BCTMP enables to maintain incompressibility of the SCK paper. The results indicate that a tailored fiber furnish, wherein the amount of BCTMP and BSKP have been optimized, may be arranged to provide SCK paper with both lower density, relatively high transparency and potential to resist compression, which facilitates an even die strike pattern during a die-cutting operation—while maintaining the tear index and tensile strength at a sufficient level for use as a substrate layer for a release liner.

Figure 3:
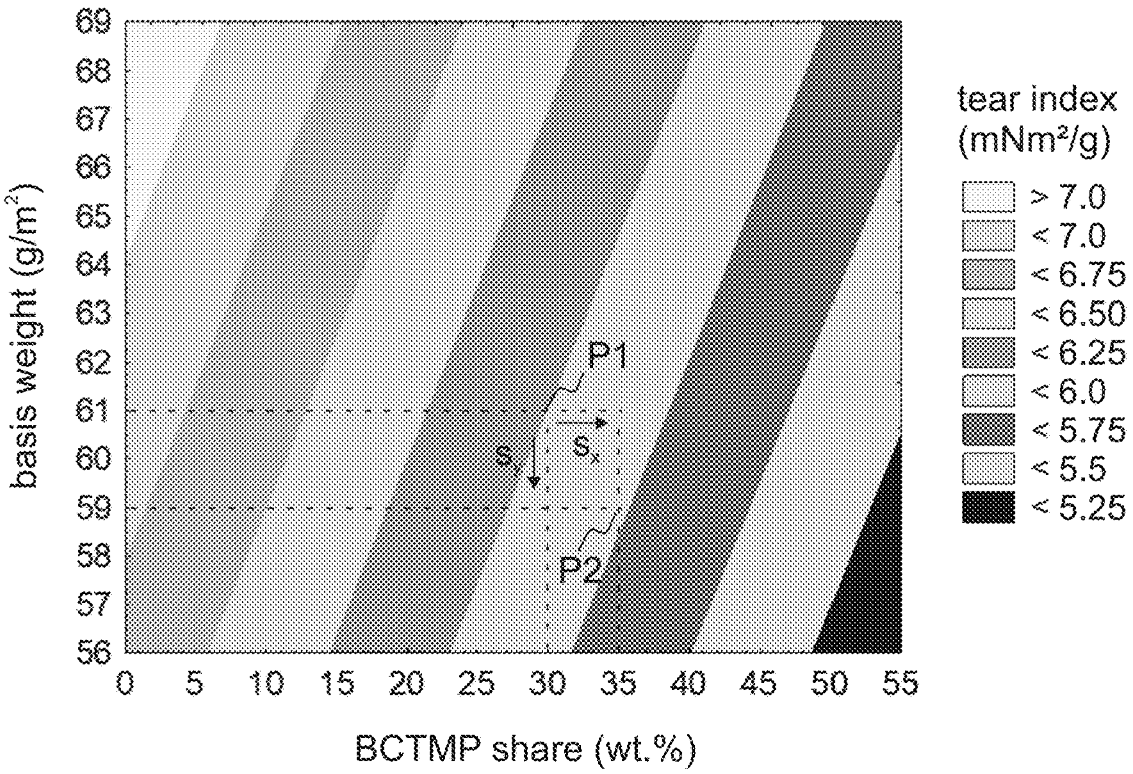
FIG. 3 is a multivariable diagram showing how tear index (mNm$^2$/g) and basis weight (g/m$^2$) correlate in SCK papers as a function of the BCTMP share (wt. %), determined as dry matter content of the paper according to SCAN-P 39:80.
Figure 4:
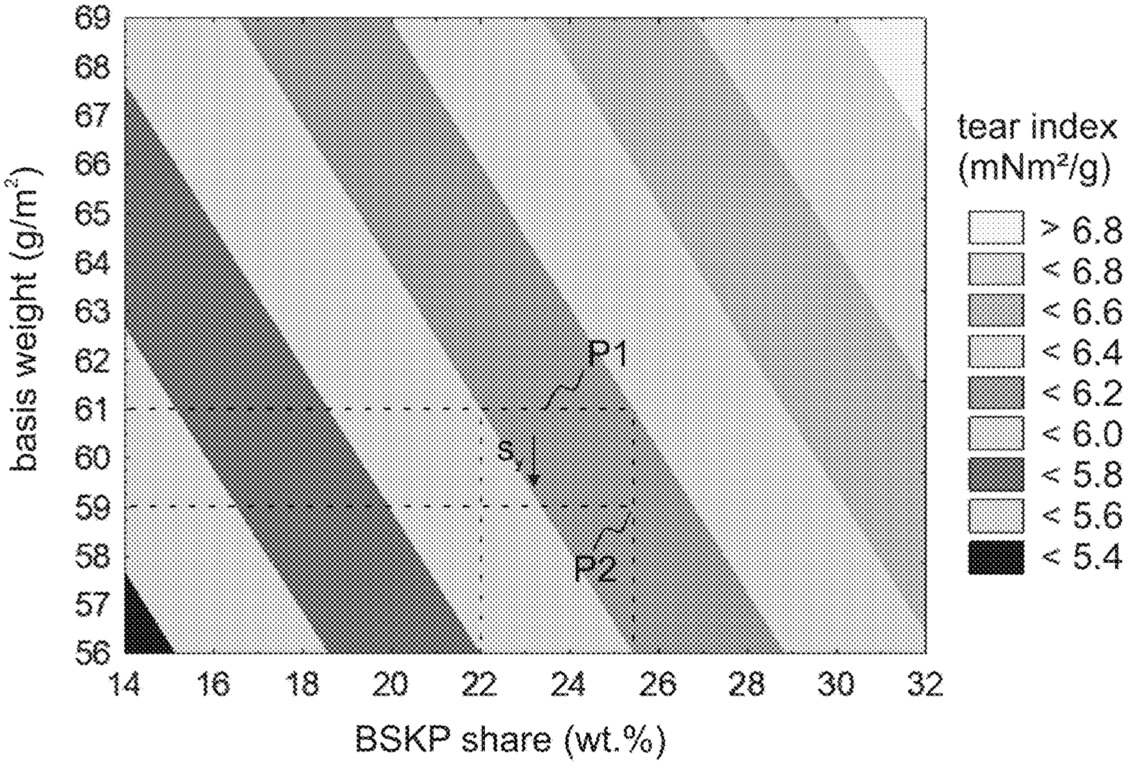
FIG. 4 is a multivariable diagram showing how tear index (mNm$^2$/g) and basis weight (g/m$^2$) correlate in SCK papers as a function of the BSKP share (wt. %), determined as dry matter content of the paper according to SCAN-P 39:80.
Figure 5:
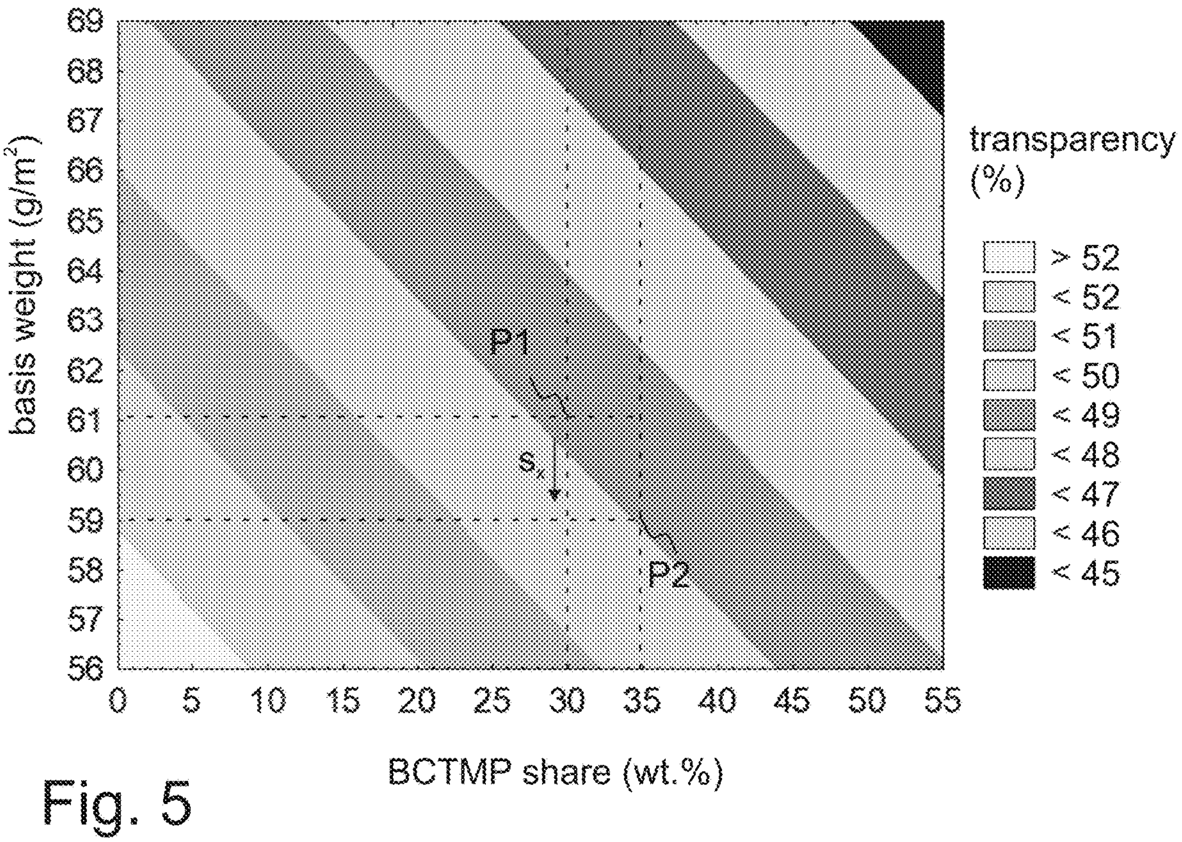
FIG. 5 is a multivariable diagram showing how transparency (%) and basis weight (g/m$^2$) correlate in SCK papers as a function of the BCTMP share (wt. %), determined as dry matter content of the paper according to SCAN-P 39:80.

The dependency of basis weight, fiber furnish composition and paper characteristics of each other was further studied by means of multivariable optimization, as illustrated by FIGS. 3 to 5. The figures illustrate, when viewed together, by way of the examples, how mechanical and optical properties of the produced SCK paper are maintained, when the basis weight of the paper is shifted and/or when the composition of the fiber furnish is altered by adjusting the amount of BCTMP and/or BSKP in the fiber furnish—while maintaining the target thickness of the SCK paper. The symbols P1 and P2 in the figures illustrate SCK papers having the same target thickness, but a different basis weight and, subsequently, different densities.

Reference is made to FIG. 3, which is a multivariable diagram based on the experimental results, and which illustrates how basis weight correlates with the tear index, as a function of BCTMP content in a SCK paper having a defined target thickness, as disclosed below. The vertical axis represents the basis weight (g/m$^2$) of the SCK paper, determined according to ISO 536. The horizontal axis represents the amount of BCTMP (wt. %) in the fiber furnish, determined as dry matter content of the paper according to SCAN P 39:80. The shading of the inclined bars in the diagram represents the range of tear index (mNm$^2$/g), determined according to ISO 1974. The inclination angle of the bars in the diagram is indicative of the direction of change of the tear index. When moving from top left corner towards the bottom right corner in the diagram, the tear index decreases.

Reference is further made to FIG. 4, which is a multivariable diagram based on the experimental results, and which illustrates how basis weight correlates with the tear index, as a function of BSKP content in a SCK paper having the same defined target thickness, as disclosed below. The vertical axis represents the basis weight (g/m$^2$) of the SCK paper, determined according to ISO 536. The horizontal axis represents the amount of BSKP (wt. %) in the fiber furnish, determined as dry matter content of the paper according to SCAN P 39:80. The shading of the inclined bars in the diagram represents the range of tear index (mNm$^2$/g), determined according to ISO 1974. The inclination angle of the bars in the diagram is indicative of the direction of change of the tear index. When moving from bottom left corner towards the top right corner in the diagram, the tear index increases.

Reference is further made to FIG. 5, which is a multivariable diagram based on the experimental results, and which illustrates how basis weight correlates with the transparency, as a function of BCTMP content in a SCK paper having the same defined target thickness, as disclosed below. The vertical axis represents the basis weight (g/m$^2$) of the SCK paper, determined according to ISO 536. The horizontal axis represents the amount of BCTMP (wt. %) in the fiber furnish, determined as dry matter content of the paper according to SCAN P 39:80. The shading of the inclined bars in the diagram represents the transparency range (%), determined according to ISO 2469. The inclination angle of the bars in the diagram is indicative of the direction of change of the transparency. When moving from bottom left corner towards the top right corner in the diagram, the transparency decreases.

FIGS. 3 and 4, when viewed together, demonstrate the interdependency of the shares of BCTMP and BSKP in the fiber furnish to the tear index of the SCK paper. This is illustrated by a situation, wherein the basis weight is shifted by 2 g/m$^2$ in a direction $s_y$ by means of adjusting the share of BCTMP in the fiber furnish by 5 wt. % in a direction $s_x$, as indicated in FIG. 3 with the dashed lines. Paper P1 represents a SCK paper having a basis weight of 61 g/m$^2$ and a target thickness of 53.5 micrometers, thus having a density of 1140 kg/m$^3$. Paper P2 represents a SCK paper having a basis weight of 59 g/m$^2$ and the same target thickness of 53.5 micrometers, thus having a density of ca.1100 kg/m$^3$. When the basis weight is decreased by 2 g/m$^2$, while maintaining the same target thickness, the density of the SCK paper P2 is subsequently reduced close to 40 kg/m$^3$, in comparison to the heavier SCK paper P1. Multivariable diagrams, such as presented by FIGS. 3 and 4, provide a tool that enables to evaluate the effect of this shift of basis weight, which has been achieved due to the change in the amount of BCTMP, in light of other parameters, such as the tear index of the SCK paper. For instance, the diagrams in FIGS. 3 and 4 indicate, that a relative change of 5 wt. % of BCTMP from 30 to 35 wt. % (indicated by distance between the vertical dashed lines in FIG. 3) may be performed while maintaining a tear index equal to or higher than 6 mNm$^2$/g (indicated by the shade of the inclined bar in FIGS. 3 and 4), when the share of BSKP in the fiber furnish is maintained sufficiently high, such as at least 22 wt. % (leftmost vertical dashed line in FIG. 4). The breadth and inclination angle of the shaded bar in FIG. 4 suggest of the potential of the BSKP to preserve the tear index, when replacing BHKP with BCTMP. When shifting from the basis weight of the SCK paper P1 to the basis weight of the SCK paper P2, a BSKP share in the range of 22 to 25.5 wt. % may be used, if a tear index in the range of 6 to 6.4 mNm$^2$/g should be achieved. Further information may be retrieved from other multivariable diagrams, such as FIG. 5, which is indicative of the effect of the same shift of basis weight to the transparency of the SCK paper. FIG. 5 also illustrates that when a relative change of 5 wt. % of BCTMP from 30 to 35 wt. % is performed to the fiber furnish, while maintaining the same target thickness by supercalendering, the fiber furnish combination enables the transparency to be maintained in a relatively high level in the range of 47 to 51% (the shades covered between the vertical dashed lines in FIG. 5). On the other hand, when the basis weight is decreased by 2 g/m$^2$ (the horizontal dashed lines in FIG. 5), while maintaining other variables unchanged, a relatively small decrease to transparency may occur, the transparency still being in the range of 48 to 50% (indicated by the shades covered between the horizontal and vertical dashed lines in FIG. 5).

Thus, referring to the above, the experimental results indicate the pliability of the SCK paper in a basis weight range of 50-70 g/m$^2$, when the underlying properties of the different type of pulps, BSKP and BCTMP in particular, are used together optimally. This enables a fiber furnish containing BCTMP in the range of 5 to 50 wt. %, when determined as dry matter content of the paper according to SCAN P 39:80, which may be supercalendered into the same thickness as a similar kraft paper with a higher basis weight, while maintaining a transparency level of at least 40%, such as in the range of 40 to 56%. Thus a significant reduction of the basis weight is obtainable, while maintaining a predefined thickness specification and without other relevant quality characteristics falling out of the SCK paper specifications.

Figure 6:
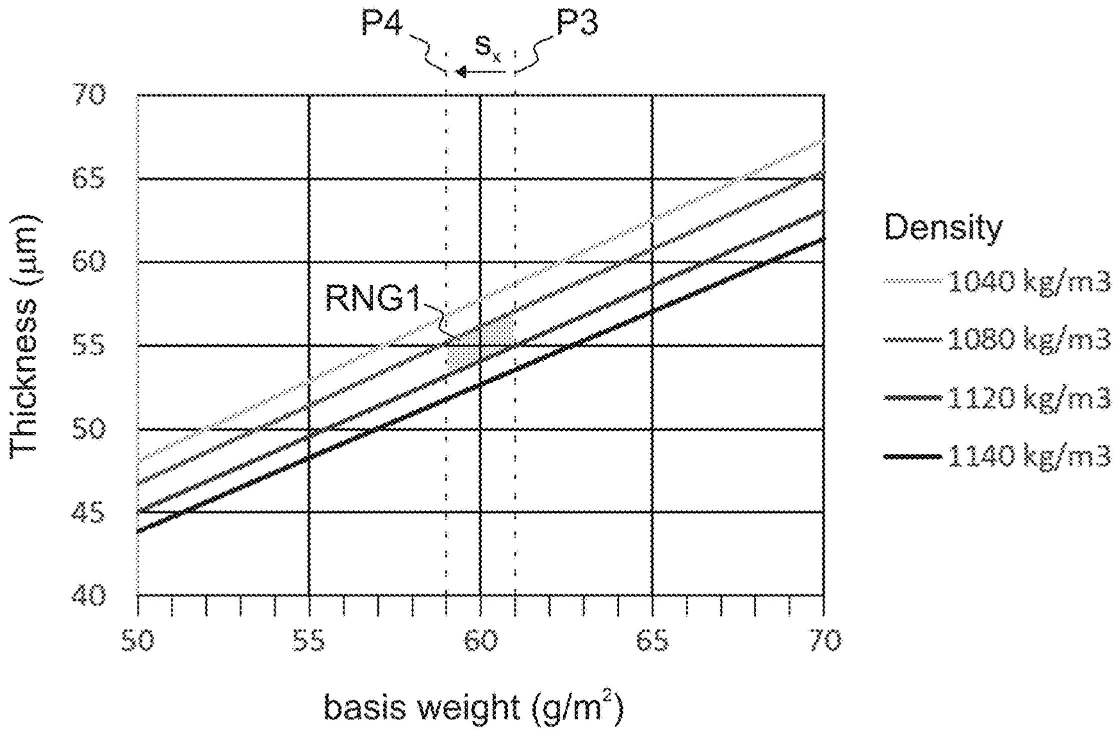
FIG. 6 is a diagram that illustrates how the characteristics of SCK paper having a basis weight in the range of 50 to 70 g/m$^2$ provide an optimization range RNG1, wherein the basis weight of the paper to be produced may be adjusted by means of a fiber furnish composition, while maintaining the target thickness and without inducing adverse effects to other paper properties, which would prevent its use as substrate layer of an industrial release liner for adhesive labels.

Reference is further made to FIG. 6, which illustrates how the characteristics of SCK paper having a basis weight in the range of 50 to 70 g/m$^2$ provide an optimization range RNG1, wherein the basis weight of the SCK paper to be produced may be adjusted by means of fiber furnish composition as disclosed above. The vertical axis represents the thickness in micrometers (µm) of the SCK paper, determined as single sheet thickness of a paper according to ISO 534:2011. The horizontal axis represents the basis weight in grams per square meters (g/m$^2$) of the SCK paper, determined according to ISO 536. The parallel diagonal lines in the diagram represents different density levels of the SCK paper, the density levels expressed in kilograms per cubic meter (kg/m$^3$). The angle of inclination of the lines in the diagram is indicative of the typical correlation strength between basis weight and thickness in industrial SCK papers in the range of 50 to 70 g/m$^2$. When moving along a diagonal lines from bottom left corner towards the top right corner in the diagram, the density remains the same, while the basis weight and the thickness increase.

In FIG. 6, paper P3 represents SCK paper having a basis weight of 61 g/m$^2$ and a target thickness of 55 micrometers, thus having a density of 1120 kg/m$^3$. Paper P4 represents SCK paper having a basis weight of 59 g/m$^2$ and the same target thickness of 55 micrometers, thus having a density of 1080 kg/m$^3$. The shaded area represents an optimization range RNG1, wherein the multivariable diagrams discussed above need to be accounted for.

Hence, when starting from SCK paper P3 and desiring a reduction of 2 g/m$^2$ of the basis weight (the distance between the vertical dashed lines indicated in FIG. 6), the multivariable diagrams provide a tool for evaluating the means for obtaining a SCK paper P4 having the same thickness and sufficient quality for the intended purpose (as illustrated by FIGS. 3 to 5). To maintain the sufficient quality, the amount of BCTMP in the fiber furnish needs to be considered in light of the amount of BSKP in the fiber furnish.

Experimental Setup B

An experimental setup was further designed wherein the relationship between BCTMP, BSKP and BHKP in fiber furnishes of SCK papers having a basis weight of less than 50 g/m$^2$ could be studied in SCK paper specimens, wherein the fiber furnish was varied both as a function of the content of BSKP as well as a function of the content of the BCTMP. Of particular interest were SCK papers having a basis weight between 30 and 50 g/m$^2$.

To better demonstrate the effects and challenges caused by the bleached Kraft pulp components in the fiber furnish during very low basis weight SCK paper manufacturing, reference experiments were conducted with SCK papers having a basis weight between 30 and 50 g/m$^2$, which did not comprise BCTMP.

Example B1—a Paper Mill Trial of Less than 50 g/m$^2$ SCK Paper Production without BCTMP An experimental trial wherein industrial supercalendered Kraft paper having a very low basis weight was produced on a paper machine at an average paper machine speed of 1180 meters/min, wherein the fiber furnish during the trial contained 60 wt. % of bleached softwood Kraft pulp (pine) and 40 wt. % of bleached hardwood Kraft pulp (birch), which are typical values for bleached Kraft pulp components in conventional SCK papers that do not comprise BCTMP. The target was to produce SCK paper having a very low basis weight of 40 g/m$^2$, and a sufficient density of equal to or higher than 1040 kg/m$^3$. A primer layer of starch in an amount of 2 g/m$^2$ was applied on the top side of the paper. The refining of the bleached hardwood Kraft pulp was performed to a target value in the range of °SR 50 to 60, to facilitate the formation of the paper web. The refining of the bleached softwood Kraft pulp was performed to a lower target value in the range of °SR 40 to 50, to preserve the fiber length and strength characteristics of the formed SCK paper. The produced amount of SCK paper during the trial was 1500 tonnes. Reference is made to Table 8 (below), which shows measurement data from samples taken from the production at the paper mill.

TABLE 8

Measured quality data of samples taken from the supercalendered Kraft papers produced at a paper machine.

| Parameter | Unit | standard | Sample 1 | Sample 2 | Sample 3 |
|---|---|---|---|---|---|
| basis weight | $g/m^2$ | ISO 536 | 39.1 | 39.6 | 39.0 |
| thickness | μm | ISO 534 | 37.1 | 37.8 | 37.3 |
| density | $kg/m^3$ | ISO 534 | 1056 | 1049 | 1047 |
| moisture | % | ISO 287 | 6.6 | 6.6 | 6.6 |
| Gurley Air Permeance TOP | Sec | T460 | 3750 | 2829 | 2245 |
| Bekk Porosity Top | Sec | ISO 5627 | 311 | 165 | 166 |
| OIL ABSORBATION Top | $g/m^2$ | SCAN-P 37:77 | 0.5 | 0.6 | 0.5 |
| OIL ABSORBATION BTM | $g/m^2$ | SCAN-P 37:77 | 2.9 | 3.0 | 2.7 |
| Cobb Size 60 S Top | $g/m^2$ | ISO 535 | 19.6 | 19.9 | 19.7 |
| Cobb Size 60 S BTM | $g/m^2$ | ISO 535 | 20.0 | 19.2 | 19.2 |
| Bekk smoothness Top | Sec | ISO 5627 | 1821 | 1552 | 1687 |
| Bekk smoothness BTM | Sec | ISO 5627 | 276 | 295 | 286 |
| PPS Top | um | ISO 8791 | 1.8 | 1.9 | 1.9 |
| PPS BTM | um | ISO 8791 | 2.5 | 2.5 | 2.4 |
| Transparency | % | ISO 2469 | 61.5 | 61.7 | 62.4 |
| Formation index | | (internal) | 24.5 | 23.0 | 24.8 |
| Tensile Strength MD | kN/m | ISO 1924-3 | 172 | 191 | 184 |
| Tensile Strength CD | kN/m | ISO 1924-3 | 1.9 | 2.0 | 2.0 |
| Tear strength MD | mN | ISO 1974 | 172 | 191 | 184 |
| Tear strength CD | mN | ISO 1974 | 165 | 183 | 173 |
| internal bond strength | $J/m^2$ | TAPPI T541 | 2000 | 2000 | 2000 |

During the trial it was observed that with the very low basis weight SCK grades of less than 50 $g/m^2$, the runnability of the paper production became more challenging. A lower basis weight means that less fiber furnish will be used to form the paper web on the forming wire, resulting into a thinner paper web. In the trial it was noticed that a larger part of the fine particles present in the pulp suspension flowed through the wire, which meant that the drainage was larger and retention capability of the formed paper web was smaller. To some extent, the operation of the paper machine could be controlled by adjusting the paper machine speed. When the paper machine speed was increased, the runnability could be maintained sufficient, up to a top speed of 1180 m/min. However, as the paper machine speed was elevated, the retention capability of the formed paper web was further reduced, which could not be fully compensated by correspondingly increasing the amount of cationic poly(acrylamide)/bentonite at the wet-end, that was used as an retention aid for the short circulation of the paper machine. This was a particular problem observed with the production of SCK paper having a very low basis weight of less than 50 $g/m^2$, wherein the fiber mixture needed sufficient refining to promote paper smoothness and density downstream in the paper manufacturing process, while providing anionic groups for the pulp fibers. The anionic groups, in this context, refer to functional groups in the pulp, which can interact with organic cations or cationic polyelectrolytes used as retention aids, thus influencing paper machine retention, runnability and paper quality. However, the obtained freeness (°SR) and amount of fine particles produced due to refining was not fully compatible with the very low basis weight of the SCK paper. The resulting thickness of the paper was relatively low and the paper possessed a relatively low tensile strength, as well as a relatively low internal bond strength.

Example B2—a Paper Mill Trial of Less than 40 $g/m^2$ SCK Paper Production without BCTMP A further experimental trial was arranged, wherein industrial supercalendered Kraft paper having a very low basis weight was produced on a paper machine at a production rate of 16 tn/h. As in Example B1 above, the fiber furnish at the beginning of the trial contained 60 wt. % of BSKP (pine) and 40 wt. % of BHKP (birch). The target was to produce SCK paper having an even lower basis weight of 35 $g/m^2$, by reducing the basis weight from a starting value of 50 $g/m^2$ and by slightly reducing the refining of the BHKP from the target value of °SR 45, to facilitate the formation of the paper web.

Early during the grammage reduction it was noticed, however, that the basis weight reduction caused significant challenges to the operation of the paper machine. The basis weight reduction to 35 $g/m^2$ necessitated an increase in the paper web tension used at the press section of the paper machine. Further, reduction of the main steam group pressure level was required and the air balance at the drying section needed to be adjusted such that less replacement air was introduced to the drying section.

Despite efforts to balance the paper machine production, a web brake occurred at the press section of the paper machine in less than 15 minutes from the beginning of the experiment. When inspecting the produced SCK paper it was visually observed to be very porous, which was considered to be due to a too low water retention capability of the formed paper web. The principal cause for the web brake was presumably the lack sufficient bonding of the fibers, which lead to poor formation of the paper web. The very thin paper web produced, wherein suboptimal fiber-fiber interaction had taken place, could not cope with the tension present at the press and the drying sections of the paper machine, wherein starch was applied on one side of the formed SCK paper (2.5 kg/tn).

The trial was therefore continued by increasing the basis weight to 38 g/m$^2$ forced share of the bleached hardwood Kraft pulp (birch) to 45 wt. % of the fiber furnish, which was noticed to reduce the porosity of the produced SCK paper. The suction of water at the beginning of the press section was also reduced, which was observed to improve the runnability of the paper web. However, due to the increased content of the bleached hardwood Kraft pulp in the fiber mixture, the deaeration at the short circulation of the paper machine became insufficient and lead to an excessive foaming. This was countered by doubling the amount of anti-foaming agent from 0.9 kg/tn to 1.8 kg/tn introduced into the pulp mixture. The reduced suction at the press section helped to overcome the web brake, but resulted into insufficient removal of water from the paper prior to the drying section, which caused problems with the surface sizing of the paper. Hence, elevated heating at the drying section was needed.

The 38 g/m$^2$ SCK paper thus produced was supercalendered, such that at the beginning of the calendering section the calender temperature was 160° C., the line pressure 435 kN/m and the final moisture content of the SCK paper was 6.5. wt. % of the weight of the paper product. The calendering speed was 700 m/min. Two separate calendering runs (Run 1, Run 2) were conducted, after which SCK paper quality parameters were tested from both runs by taking samples from the produced SCK papers. Reference is made to Table 8 (below), which shows measurement data from the paper machine.

TABLE 8

Measured quality data of samples taken from the supercalendered Kraft papers produced at a paper machine.

| Parameter | Unit | standard | Run 1 | Run 2 |
|---|---|---|---|---|
| thickness | μm | ISO 534 | 38.2 | 40.1 |
| basis weight | g/m$^2$ | ISO 536 | 37.9 | 37.4 |
| density | kg/m$^3$ | ISO 534 | 992 | 933 |
| air resistance (Gurley) | second | TAPPI T460 | 297 | 297 |
| Bekk porosity | s/10 ml | ISO 5627 | 20 | 10 |
| β- formation | g/m$^2$ | (internal) | 3.46 | 3.46 |
| tensile strength (MD) | kN/m | ISO 1924-3 | 3.55 | 3.49 |
| tensile strength (CD) | kN/m | ISO 1924-3 | 1.31 | 1.31 |
| tearing resistance (MD) | mN | ISO 1974 | 204 | 209 |
| tearing resistance (CD) | mN | ISO 1974 | 237 | 212 |
| internal bond strength | J/m$^2$ | TAPPI T541 | 1976 | 1976 |
| TEA (MD) | J/m$^2$ | ISO 1924-3 | 40 | 38 |
| TEA (CD) | J/m$^2$ | ISO 1924-3 | 60 | 62 |
| CIE L-value (D65/10°) | | ISO 11475: 2017 | 93 | 94 |
| CIE a-value (D65/10°) | | ISO 11475: 2017 | −0.95 | −0.13 |
| CIE b-value (D65/10°) | | ISO 11475: 2017 | 4 | 4 |
| Transparency | % | ISO 2469 | 64 | 61 |
| Opacity | % | ISO 2471 | 36 | 39 |
| ISO brightness | % | ISO 2470 | 78 | 80 |
| Cobb 60 s (top side) | g/m$^2$ | ISO 535 | 27.6 | 27.6 |
| Cobb 60 s (bottom side) | g/m$^2$ | ISO 535 | 28.2 | 28.2 |
| PPS (top side) | μm | ISO 8791 | 1.75 | 2.57 |
| PPS (bottom side) | μm | ISO 8791 | 2.44 | 2.83 |
| Moisture content | % | ISO 287 | 6.0 | 6.5 |

The results of the experimental trials described above demonstrate the challenges of producing very low basis weight industrial supercalendered Kraft paper, even without BCTMP being present in the fiber furnish. When the basis weight is reduced to below 50 g/m$^2$, the production speed at the paper machine needed to be increased, to maintain runnability of the paper machine sufficient. The retention, however, becomes problematic on elevated production speed, as sufficient fiber bonding upon formation of the paper web is more difficult in SCK grades having a basis weight of less than 50 g/m$^2$, whereby the properties of the SCK paper become increasingly more dependent of the composition of fiber furnish and the runnability at the wet end of the paper machine. Downstream in the manufacturing process, the tension of the paper web is more critical due to the challenges in the internal bonding of the formed paper web, which is thinner than in the grades having a higher basis weight. Moreover, the thickness of the SCK paper needed to be matched with the low basis weight, in order to obtain a sufficient density for the SCK paper.

As a combined summary of the two experimental trials B1 and B2 above, an industrial supercalendered Kraft paper having a basis weight of less than 50 g/m$^2$ and wherein the fiber furnish consisted of bleached chemical pulp proved to be less cost-efficient than a corresponding paper grade having a higher basis weight. Since a SCK paper is a high-density paper, the basis weight correlates with the thickness of the paper. A SCK paper having a basis weight of less than 50 g/m$^2$ is a product wherein the final thickness is less than 50 micrometers and which has a high transparency of 60% or higher. Despite the high share of 60 wt. % of BSKP in the fiber furnish, the low basis weight and corresponding low thickness of the SCK paper proved to result into a considerably higher amount of reject being generated during the paper production, as the runnability deteriorated as a function of decreasing basis weight. In the trials, the amount of reject generated during the paper production was approximately double to what has been observed in conventional SCK papers having a basis weight higher than 50 g/m$^2$. In addition, the relatively high share of BSKP in the fiber furnish was a cost factor that made the production more expensive.

The basis weight of less than 50 g/m$^2$ and low thickness also have an effect to the dimensional stability and strength characteristics of the paper. The low thickness of less than 50 micrometers reduced the paper tensile and tear strength, when compared to the characteristics of SCK paper grades having a higher basis weight. Also the shrinkage of the SCK paper, which was noted as an increased curling of the paper, became more of an issue.

While the presence of BCTMP in the very low basis weight grades would not be problematic for the transparency and would increase the bulk of the paper, the quality characteristics of the SCK paper product relevant for release liner use, such as paper strength, would suffer further from the BCTMP. Therefore, the optimization of the fiber furnish composition in SCK paper grades having a basis weight of less than 50 g/m$^2$ becomes increasingly more difficult.

Example B3—Comparing Fibre Mixtures by Means of Computational Modelling

In a further experimental study, effects of BHKP, BSKP and BCTMP to a fiber furnish of a SCK paper production was studied by means of computational modelling.

The computational modelling was performed with Softa-Cell, which is a mathematical modelling software developed by a commercial vendor (GloCell Oy) for multivariable optimization and simulation. The software is designed for simulating a change which would occur upon varying a pulp or a paper quality parameter, such as fiber furnish mixture and degree of refining, a certain amount from a given reference situation. Historical data of the principal factors contributing to paper quality, that is, previously measured quality characteristics of specific pulp samples and fiber furnish mixtures from a paper machine and/or laboratory experiments, was used to create a comprehensive database model for the software, which then used the existing data to simulate the effect of the varied parameter to the process and/or product.

A first simulation experiment aimed to validate the effect of each of BSKP (birch or *eucalyptus*), BHKP (pine) and BCTMP (birch) in a fiber furnish. This was performed by simulating a SCK paper having a basis weight between 30 and 50 g/m² by means of trial points, wherein in each trial point, the fiber furnish constituted of a single pulp type only. This enabled to study the development of the quality characteristics in a fiber furnish due to a selected pulp component. The effect of other pulp components could thus be eliminated.

The modelling was performed using the following parameters for characterizing the pulps in the fiber furnish recipes:

bleached chemical pulp from hardwood (*eucalyptus*)
°SR=50, CSF=201 ml, SEC=158 kWh/t
bleached chemical pulp from hardwood (birch)
°SR=35, CSF=328 ml, SEC=125 kWh/t
bleached chemical pulp from softwood (pine)
°SR=35, CSF=350 ml, SEC=243 kWh/t
bleached chemithermomechanical pulp from hardwood (birch)
°SR=40, CSF=307 ml, SEC=43 kWh/t The results of the first simulation experiment at the endpoints of 30 and 50 g/m² are presented in Table 10 (below). The abbreviations used for the furnish are as follows:

BSKP=bleached softwood kraft pulp (pine)
BHKP-b=bleached hardwood kraft pulp (birch)
BHKP-e=bleached hardwood kraft pulp (*eucalyptus*)
BCTMP=bleached chemithermomechanical pulp (pine and birch)

in bleached hardwood kraft pulps, in particular BHKP from birch and the worst in BCTMP. The tearing strength was the highest for BSKP, while BCTMP, again, was not able to provide this characteristic. The out-of-plane strength, indicated by the Scott-bond test value, was the highest in bleached hardwood kraft pulp from birch and the worst in BCTMP, which did not promote internal bond strength upon formation. The BCTMP did provide the highest opacity, which also indicated a lower transparency value. This was also seen as a higher light scattering ability than what was provided by the bleached hardwood kraft pulps (data not shown). However, as demonstrated in the mill trials (above), the transparency of a SCK paper having a basis weight between 30 and 50 g/m² is relatively high due to low thickness and can be maintained above 40%, such as in the range of 45 to 80%, preferably in the range of 50 to 75%, most preferably in the range of 55 to 70%, (ISO 2469).

A second simulation experiment was performed based on the findings of the first simulation experiment, wherein combinations of the most promising ranges of BHKP, BSKP and BCTMP in a fiber furnish were selected and studied further, to evaluate and determine optimal ranges for SCK paper production in grades comprising BCTMP and having a very low basis weight of less than 50 g/m², preferably between 30 and 50 g/m².

The modelling was performed using the same parameters for characterizing the pulps in the fiber furnish recipes as in the first simulation.

In the second simulation experiment, a SCK paper having a basis weight between 30 and 50 g/m² was thus modelled with fiber furnish compositions, which contained bleached chemical pulp from softwood in an amount of at least 25 wt. %,

TABLE 10

Experimental results of SCK paper quality characteristics in grades having a basis weight between 30 and 50 g/m² in a situation wherein the fiber furnish constitutes of a single pulp type only.

| Furnish | Basis weight (g/m²) | Bulking thickness (μm) | Bulk (cm³/g) | Air resist. (Gurley) (s) | Tensile strength (kN/m) | Stretch (%) | Tearing strength (mN) | Scott Bond (J/m²) | Opacity (%) |
|---|---|---|---|---|---|---|---|---|---|
| BSKP | 50 | 65.1 | 1.30 | 101.3 | 4.45 | 3.64 | 624 | 895 | 55.5 |
| BHKP-b | 50 | 60.8 | 1.22 | 85.3 | 4.36 | 3.66 | 381 | 1021 | 58.7 |
| BHKP-e | 50 | 63.8 | 1.28 | 70.5 | 3.98 | 4.33 | 414 | 841 | 66.2 |
| BCTMP | 50 | 90.4 | 1.81 | 10.7 | 1.95 | 1.39 | 215 | 199 | 73.1 |
| BSKP | 30 | 38.3 | 1.28 | 48.4 | 2.44 | 3.20 | 422 | 1009 | 41.4 |
| BHKP-b | 30 | 35.8 | 1.19 | 40.8 | 2.39 | 3.21 | 258 | 1151 | 44.5 |
| BHKP-e | 30 | 37.5 | 1.25 | 33.7 | 2.18 | 3.80 | 280 | 948 | 52.3 |
| BCTMP | 30 | 53.2 | 1.77 | 5.10 | 1.07 | 1.22 | 145 | 224 | 59.3 |

The results of the first simulation experiment demonstrate the very high potential of the BCTMP for providing bulking thickness in all grades having a basis weight between 30 and 50 g/m², in comparison with the BHKP and BSKP. On the other hand, the bulk values indicate the high capability of the bleached hardwood kraft pulp from birch for providing density (i.e. inverse of bulk). The air resistance, when assessed as Gurley porosity, was the highest in the BSKP, while BCTMP was not deemed suitable for providing sufficient air resistance. The bleached softwood and hardwood kraft pulps were the best for providing tensile strength, in particular BSKP from pine and BHKP from birch. The stretch, denoting the maximum tensile strain developed in the test specimen before rupture (TAPPI T494), was the best bleached chemical pulp from hardwood (birch) in an amount in the range of 0 to 75 wt. %, and
bleached chemithermomechanical pulp from hardwood (birch) in an amount of 0 to 25 wt. %, such that the total amount of pulps forming the fiber furnish was 100 wt. %.

Of particular interest were the data points, which simulated a SCK paper having a combination of BCMTP, BSKP and BHKP, and wherein the content of the BSKP was in the range of 25 to 35 wt. % of the fiber furnish.

The results of the second simulation experiment at the endpoints of 30 and 50 g/m² are presented in Table 11 (below). In Table 11, the abbreviations SW, HW and B refer to BSKP (pine), BHKP (birch) and BCTMP (pine and birch), accordingly.

TABLE 11

Experimental results of SCK paper quality characteristics in grades having a basis weight between 30 and 50 g/m$^2$ in a situation wherein the fiber furnish constitutes of a combination of BSKP and BHKP pulps with or without BCTMP.

| Furnish SW/HW/B | Basis weight (g/m$^2$) | Bulking thickness (μm) | Bulk (cm$^3$/g) | Air resist. (Gurley) (s) | Tensile strength (kN/m) | Stretch (%) | Tearing strength (mN) | Scott Bond (J/m$^2$) | Opacity (%) |
|---|---|---|---|---|---|---|---|---|---|
| 1. 25/50/25 | 50 | 69.3 | 1.39 | 70.7 | 3.78 | 3.09 | 400 | 784 | 62.6 |
| 2. 25/60/15 | 50 | 66.3 | 1.33 | 78.1 | 4.02 | 3.31 | 417 | 866 | 60.8 |
| 3. 25/75/0 | 50 | 61.8 | 1.24 | 89.3 | 4.39 | 3.65 | 442 | 990 | 57.9 |
| 4. 35/50/15 | 50 | 66.7 | 1.33 | 79.7 | 4.03 | 3.31 | 441 | 854 | 60.6 |
| 5. 35/65/0 | 50 | 62.3 | 1.25 | 90.9 | 4.40 | 3.65 | 466 | 977 | 57.6 |
| 6. 50/50/0 | 50 | 62.9 | 1.26 | 93.3 | 4.41 | 3.65 | 502 | 958 | 57.2 |
| 7. 75/25/0 | 50 | 64.0 | 1.28 | 97.3 | 4.43 | 3.65 | 563 | 927 | 56.4 |
| 8. 25/50/25 | 30 | 40.8 | 1.36 | 33.8 | 2.07 | 2.71 | 271 | 884 | 48.3 |
| 9. 25/60/15 | 30 | 39.0 | 1.30 | 37.3 | 2.20 | 2.91 | 282 | 977 | 46.5 |
| 10. 25/75/0 | 30 | 36.4 | 1.21 | 42.7 | 2.40 | 3.21 | 299 | 1116 | 43.7 |
| 11. 35/50/15 | 30 | 39.3 | 1.31 | 38.1 | 2.21 | 2.91 | 298 | 963 | 46.2 |
| 12. 35/65/0 | 30 | 36.7 | 1.22 | 43.4 | 2.41 | 3.20 | 315 | 1102 | 43.4 |
| 13. 50/50/0 | 30 | 37.1 | 1.23 | 44.6 | 2.41 | 3.20 | 340 | 1080 | 43.0 |

The results of the second simulation experiment demonstrate that the presence of BCTMP is beneficial and has a prominent role in the development of sufficient bulking thickness, which is of importance in the SCK paper grades having a basis weight between 30 and 50 g/m$^2$. The role of BCTMP in development of air resistance, however, is very poor as demonstrated above, whereby the ratio of BCTMP to bleached Kraft pulp needs to be considered to find a balance between bulking thickness and air resistance. The bulk value results further indicate that the amount of BCTMP in the fiber furnish should not exceed 20 wt. %, to preserve a sufficient density in the SCK paper grades having a basis weight between 30 and 50 g/m$^2$. A density in the range of 1040 to 1200 kg/m$^3$ is easier to achieve in the supercalendering step, when the share of BSKP and BHKP in the fiber furnish is sufficiently large, preferably equal to or higher than 80 wt. % of the fiber furnish. The same decreasing trend in values as a function of the BCTMP content was also observed in respect of strength properties, when assessing the tensile strength, stretch, tearing strength and scott bond values between trial points which contained BCTMP and which did not. A higher BCTMP content correlated with a lower test value, indicating a reduced performance and therefore reduced suitability for use as a substrate layer of an industrial release liner for adhesive labels. A SCK paper needs to have sufficient strength characteristics to withstand the stresses applied at high-speed automated labelling processes, whereby the amount of BSKP in the fiber furnish should not be below 25 wt. %, while the amount of BCTMP in the fiber furnish should not exceed 20 wt. %. BSKP, in particular, is beneficial for providing tensile and tearing strength to the formed SCK paper.

Figure 7:
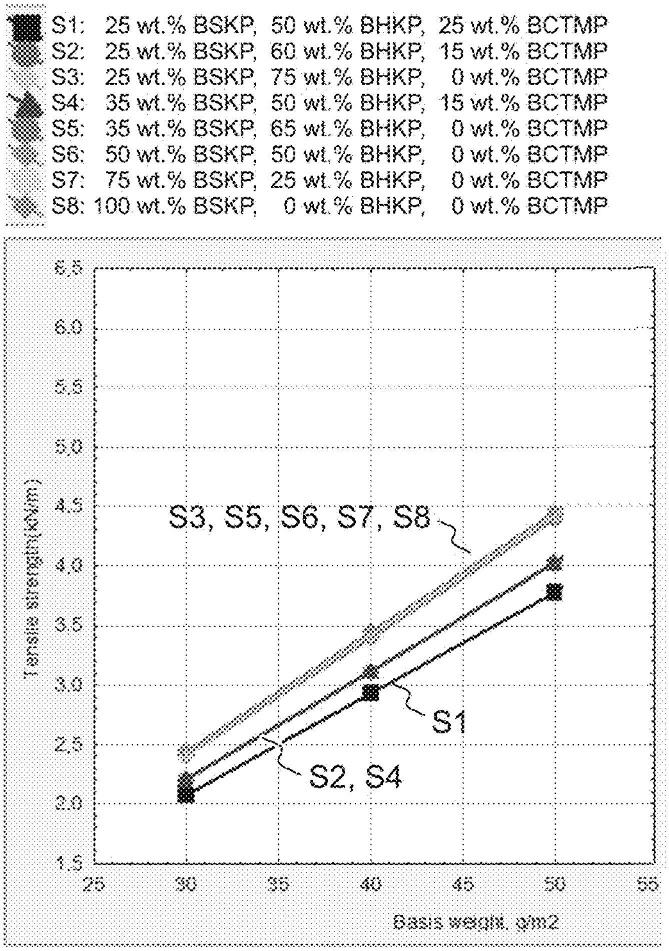
FIG. 7 is a diagram that illustrates how tensile strength (kN/m) behaves in very low basis weight (g/m$^2$) SCK papers containing BCTMP (wt. %), determined as dry matter content of the paper according to SCAN-P 39:80.

The behaviour of tensile strength in the SCK paper grades having a basis weight between 30 and 50 g/m$^2$ is illustrated in FIG. 7, which is another comparative view to the experimental results of the second simulation. The compositions S1, S2 and S4 comprising 15 to 25 wt. % of BCTMP are clearly distinguished by their lower capability to provide tensile strength, throughout the basis weight range. The compositions S3 and S5-S8, which did not comprise BCTMP, had a higher tensile strength. Moreover, FIG. 7 illustrates the dependency of the tensile strength of the BCTMP content of the fiber furnish at very low basis weight grades; the content of BCTMP in the composition of the fiber furnish has a more significant impact on the tensile strength characteristics of the SCK paper, than the content of BSKP. The variation between S3 and S5-S8 is very small, despite the substantial increase in the amount of BSKP in the fiber furnish.

Figure 8:
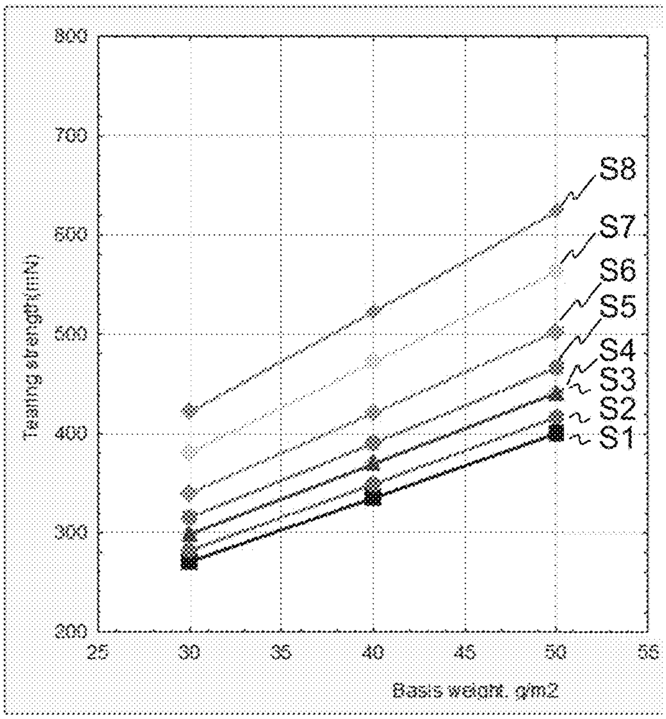
FIG. 8 is a diagram that illustrates how tearing strength (mN) behaves in very low basis weight ($g/m^2$) SCK papers containing BCTMP (wt. %), determined as dry matter content of the paper according to SCAN-P 39:80.

A second comparison was performed to evaluate the behaviour of tearing strength in the SCK paper grades having a basis weight between 30 and 50 g/m$^2$, as illustrated in FIG. 8. Unexpectedly, the content of BCTMP in the fiber furnish was not the driver for all strength characteristics. Instead, the tearing strength of a SCK paper at very low basis weight grades was highly dependent of the content of BSKP in the composition of the fiber furnish. The lowest and highest tearing strength values were observed in compositions S1 having the smallest and S8 having the highest content of BSKP in the composition of the fiber furnish, respectively.

Figure 9:
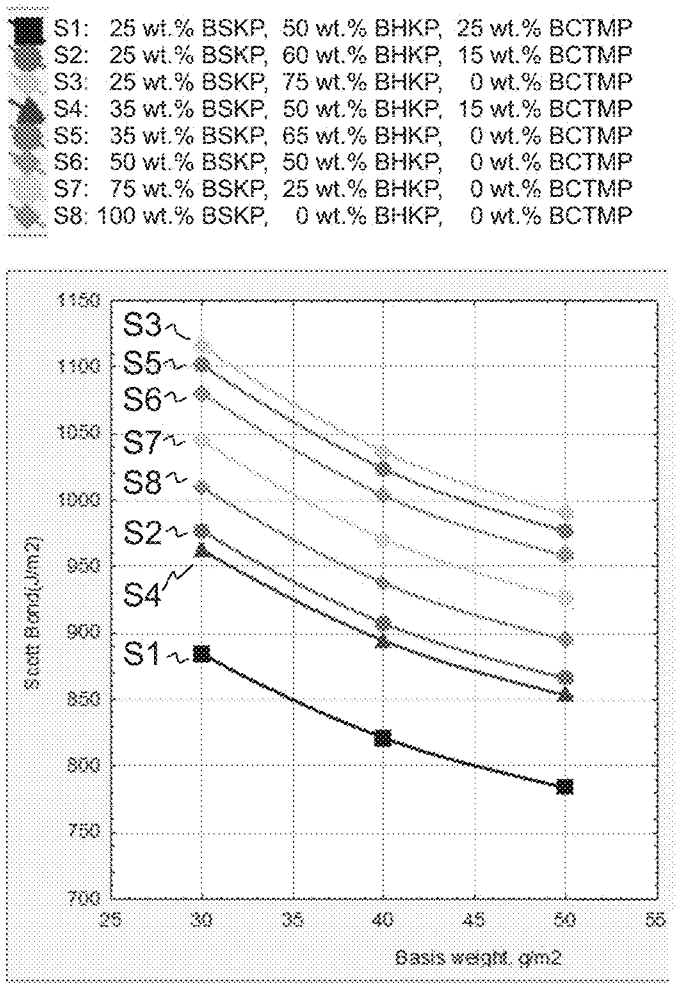
FIG. 9 is a diagram that illustrates how scott bond ($J/m^2$) behaves in very low basis weight ($g/m^2$) SCK papers containing BCTMP (wt. %), determined as dry matter content of the paper according to SCAN-P 39:80.

A third comparison was performed to evaluate the behaviour of the bonding of the fibers, which is relevant for the good formation of the paper web, as explained above. This fiber-fiber interaction was assessed by the internal bond strength (Scott Bond, TAPPI T541) in the SCK paper grades having a basis weight between 30 and 50 g/m$^2$, as illustrated in FIG. 9. Again, unexpectedly, neither the content of BCTMP or the content of the BSKP in the fiber furnish, alone, was able to explain the order of the observed results. While the content of the BCTMP was dominant in the sense that a higher content of BCTMP ion the fiber furnish correlated with a lower internal bond strength value, as evidenced by compositions S1, S4 and S2, the order appeared to be further affected by the content of the BHKP in the fiber furnish, which was more relevant than the content of the BSKP in the fiber furnish. This was evidenced by the compositions S3, S5 and S6, which contained 75 wt. %, 65 wt. % and 50 wt. % of the BHKP, respectively. The amount of BSKP in the same compositions was decreasing, indicating that internal bond strength was better obtained with BHKP than with BSKP.

Hence, as described above, the reduction of BCTMP in a fiber furnish may be used for increasing the tensile strength of the SCK paper, while the sufficiently high share of BSKP may be used for increasing the tear strength of the SCK paper. The internal bond strength may be provided by high amounts of BHKP, particularly BHKP made of birch, due to its ability to provide basic structure for the paper web upon formation, and thereby facilitate the building of sufficient strength, density and smoothness for the SCK paper.

The examples B1 to B3 above illustrate the particularities of SCK paper grades having a basis weight of less than 50 $g/m^2$ and how they are more influenced by the characteristics of the BCTMP, in comparison to SCK paper grades having a basis weight higher than 50 $g/m^2$. The examples B1 to B3 further illustrate the challenges of producing very low paper thickness, and the unexpected effects that pulp combination optimization in a fiber furnish may provide. While BCTMP in the fiber furnish provides bulk, it is not well suited to preserve the strength characteristics of the formed paper product. However, by optimizing the relative shares of BHKP, BSKP and BCTMP in the fiber furnish, the manufacturing of the SCK paper on a paper machine may be facilitated and a sufficient quality of the produced SCK paper maintained for use as a substrate layer of an industrial release liner, without downgauging.

The invention disclosed above has been described with the aid of illustrations and examples. The methods or any product obtained by the methods are not limited solely to the above presented examples, but may be modified within the scope of the appended claims.

The invention claimed is:

1. A supercalendered kraft paper suitable for use as a substrate layer of an industrial release liner for adhesive labels, the supercalendered kraft paper comprising:

- a basis weight of less than 50 $g/m^2$, when determined according to ISO 536; and
- a fiber furnish determinable with standard ISO 9184-4 in conjunction with standard ISO 9184-1, the fiber furnish comprising
  - bleached hardwood kraft pulp,
  - bleached softwood kraft pulp and
  - bleached chemithermomechanical pulp,
- such that the supercalendered kraft paper includes
  - the bleached chemithermomechanical pulp in a range of 10 to 20 wt. % and the bleached softwood kraft pulp in an amount equal to or higher than 25 wt. %, when determined as dry matter content of the paper according to SCAN-P 39:80,
- the supercalendered kraft paper thereby having
  - a transparency level equal to or higher than 40%, when determined according to ISO 2469 and
  - a density in the range of 1040 to 1200 $kg/m^3$, when determined according to ISO 534.

2. The paper according to claim 1, wherein the fiber furnish has an average length weighted fiber length in the range of 0.95 to 1.16 mm, when determined according to ISO 16065-2:2014.

3. The paper according to claim 1, wherein the supercalendered kraft paper contains the bleached softwood kraft pulp in an amount in the range of 30 to 35 wt. %, when determined as dry matter content of the paper according to SCAN-P 39:80.

4. The paper according to claim 1, wherein the supercalendered kraft paper contains the bleached hardwood kraft pulp in an amount in the range of 55 to 65 wt. %, when determined as dry matter content of the paper according to SCAN-P 39:80.

5. The paper according to claim 1, the bleached chemithermomechanical pulp comprising fibers from softwood.

6. The paper according to claim 1, the bleached chemithermomechanical pulp comprising fibers from hardwood.

7. The paper according to claim 1, the bleached softwood kraft pulp fibers being from the genus *Picea, Abies, Larix* or *Pinus*.

8. The paper according to claim 1, the bleached hardwood kraft pulp fibers being from the genus *Betula, Acer, Populus* or *Eucalyptus*.

9. The paper according to claim 1, wherein the share of softwood fibers in the bleached chemithermomechanical pulp is in the range 10 to 60 wt. % when determined as dry matter content of the bleached chemithermomechanical pulp according to SCAN-P 39:80.

10. The paper according to claim 1, wherein the basis weight of the paper is between 30 and 45 $g/m^2$, when determined according to ISO 536.

11. The paper according to claim 1, wherein the supercalendered kraft paper has a transparency in the range of 55 to 70%, when determined according to ISO 2469.

12. The paper according to claim 1, the supercalendered kraft paper comprising CIE L*, a*, b* colour space coordinate values, wherein

- L* is in the range of 92 to 98,
- a* is in the range of −4 to +2, and
- b* is in the range of +5 to +11,
- when determined by means of diffuse reflectance method with the elimination of specular gloss, using 2° standard observer, in accordance with ISO 11475:2017(en).

13. The paper according to claim 1, wherein the supercalendered kraft paper has a density in the range of 1050 to 1100 $kg/m^3$, when determined according to ISO 534.

14. The paper according to claim 1, the fiber furnish comprising:

- bleached hardwood kraft pulp in an amount equal to or higher than 55 wt. %;
- bleached softwood kraft pulp in an amount equal to or higher than 25 wt. %; and
- bleached chemithermomechanical pulp in an amount equal to or higher than 10 wt. %,
- such that the total amount of bleached hardwood kraft pulp, bleached softwood kraft pulp and bleached chemithermomechanical pulp in the fiber furnish is 100 wt. %, when determined as dry matter content of the paper according to SCAN-P 39:80.

15. A release liner comprising a substrate layer and a release coating, wherein the substrate layer is a supercalendered kraft paper according to claim 1, which comprises a primer coating applied on at least one side of the supercalendered kraft paper.

16. A method of manufacturing supercalendered kraft paper suitable for use as a substrate layer of an industrial release liner for adhesive labels, the method comprising:

- mixing together
- bleached hardwood kraft pulp,
- bleached softwood kraft pulp, and
- bleached chemithermomechanical pulp,
- such that a pulp mixture is obtained, which has a fiber furnish determinable with standard ISO 9184-4 in conjunction with the standard ISO 9184-1;
- forming a paper web from the pulp mixture on a paper machine;
- reducing moisture content of the paper web in a press section;
- drying the paper web in a drying section, thereby forming paper; and
- calendering the paper,
- such that a supercalendered kraft paper is obtained having a basis weight of less than 50 $g/m^2$, and which contains the bleached chemithermomechanical pulp in a range of 10 to 20 wt. % and the bleached softwood kraft pulp in an amount equal to or higher than 25 wt. %, when determined as dry matter content of the paper according to SCAN P 39:80, the supercalendered kraft paper thereby having a transparency level equal to or higher than 40%, when determined according to ISO 2469, and a density in the range of 1040 to 1200 kg/m$^3$, when determined according to ISO 534.

17. The method according to claim 16, wherein prior to mixing, the bleached chemithermomechanical pulp has a Schopper-Riegler number equal to or less than 60, when determined according to ISO 5267-1.

18. The method according to claim 16, wherein prior to mixing, the bleached softwood kraft pulp has a Schopper-Riegler number equal to or less than 60, when determined according to ISO 5267-1.

* * * * *